United States Patent
Kung et al.

(10) Patent No.: US 11,032,845 B2
(45) Date of Patent: Jun. 8, 2021

(54) METHOD AND APPARATUS FOR TRANSMITTING SIDELINK MEASUREMENT REPORT IN SIDELINK IN A WIRELESS COMMUNICATION SYSTEM

(71) Applicant: ASUSTek Computer Inc., Taipei (TW)

(72) Inventors: Yi-Hsuan Kung, Taipei (TW);
Chun-Wei Huang, Taipei (TW);
Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/076,886

(22) Filed: Oct. 22, 2020

(65) Prior Publication Data

US 2021/0136810 A1 May 6, 2021

Related U.S. Application Data

(60) Provisional application No. 62/931,012, filed on Nov. 5, 2019.

(51) Int. Cl.
| | | |
|---|---|---|
| *H04W 4/00* | (2018.01) | |
| *H04W 72/14* | (2009.01) | |
| *H04W 72/10* | (2009.01) | |
| *H04B 7/06* | (2006.01) | |
| *H04W 80/02* | (2009.01) | |
| *H04W 92/18* | (2009.01) | |

(52) U.S. Cl.
CPC .......... *H04W 72/14* (2013.01); *H04B 7/0626* (2013.01); *H04W 72/10* (2013.01); *H04W 80/02* (2013.01); *H04W 92/18* (2013.01)

(58) Field of Classification Search
CPC ..... H04W 72/14; H04W 80/02; H04W 72/10; H04W 92/18; H04B 7/0626
USPC ................................................... 370/329, 330
See application file for complete search history.

(56) References Cited

U.S. PATENT DOCUMENTS

| | | | |
|---|---|---|---|
| 2018/0220439 A1 | 8/2018 | Lee et al. | |
| 2018/0263026 A1* | 9/2018 | Loehr | H04W 72/10 |
| 2019/0200255 A1 | 6/2019 | Yi et al. | |
| 2019/0261361 A1* | 8/2019 | Xiong | H04W 72/02 |
| 2020/0228248 A1* | 7/2020 | Islam | H04L 5/0055 |
| 2020/0337024 A1* | 10/2020 | Tang | H04W 72/04 |

FOREIGN PATENT DOCUMENTS

EP    3051737 B1    1/2020

OTHER PUBLICATIONS

Corresponding European Patent Application No. 20203241.3, Extended European Search Report, dated Feb. 9, 2021.
"Physical Layer Procedure for NR-V2X Sidelink", OPPO, 3GPP TSG RAN WG1 #97, R1-1906475, Agenda Item No. 7.2.4.5, Document for Discussion and Decision, Reno, USA, May 13-17, 2019.

* cited by examiner

*Primary Examiner* — Chuong T Ho
(74) *Attorney, Agent, or Firm* — Cooper Legal Group, LLC

(57) ABSTRACT

A method and apparatus are disclosed. In an example from the perspective of a first device, the first device performs sidelink communication with one or more destinations. The first device receives and/or selects a sidelink grant associated with a sidelink transmission. Responsive to the sidelink grant, the first device selects a first destination of the one or more destinations based upon a report signaling. The first device performs the sidelink transmission associated with the sidelink grant to the first destination.

20 Claims, 12 Drawing Sheets

800 ⇀

| UE2 \ UE3 | Data and MAC CE | Data only | MAC CE only |
|---|---|---|---|
| Data and MAC CE | Case 1 | Case 2 | Case 3 |
| Data only | Case 2 | N/A | Case 4 |
| MAC CE only | Case 3 | Case 4 | Case 5 |

METHOD AND APPARATUS FOR TRANSMITTING SIDELINK MEASUREMENT REPORT IN SIDELINK IN A WIRELESS COMMUNICATION SYSTEM

CROSS-REFERENCE TO RELATED APPLICATIONS

The present Application claims the benefit of U.S. Provisional Patent Application Ser. No. 62/931,012 filed on Nov. 5, 2019, the entire disclosure of which is incorporated herein in its entirety by reference.

FIELD

This disclosure generally relates to wireless communication networks, and more particularly, to a method and apparatus for transmitting a sidelink measurement report in sidelink in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first device, the first device performs sidelink communication with one or more destinations. The first device receives and/or selects a sidelink grant associated with a sidelink transmission. Responsive to the sidelink grant, the first device selects a first destination of the one or more destinations based upon a report signaling, wherein the report signaling is not associated with a sidelink logical channel. The first device performs the sidelink transmission associated with the sidelink grant to the first destination.

In an example from the perspective of a first device, the first device performs first sidelink communication with a second device, wherein the second device is associated with a second destination. The first device performs second sidelink communication with a third device, wherein the third device is associated with a third destination. The first device triggers a first report signaling associated with the second device. The first device receives and/or selects a sidelink grant associated with a sidelink transmission, wherein the first device has sidelink data, associated with the third device, available for transmission. Responsive to the sidelink grant, the first device selects a destination, from among the second destination and the third destination, based upon the first report signaling. The first device performs the sidelink transmission associated with the sidelink grant to the destination that is selected.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: R1-1908917, "PHY layer procedures for NR sidelink", Ericsson; R1-1905837, Final Report of 3GPP TSG RAN WG1 #96 v2.0.0 (Athens, Greece, 25 Feb.-1 Mar. 2019); Draft Report of 3GPP TSG RAN WG1 #98bis v0.1.0; 3GPP TS 36.321 V 15.7.0; 3GPP RAN1#94 chairman's note; 3GPP RAN1#98bis chairman's note. The standards and documents listed above are hereby expressly incorporated by reference in their entirety.

Figure 1:
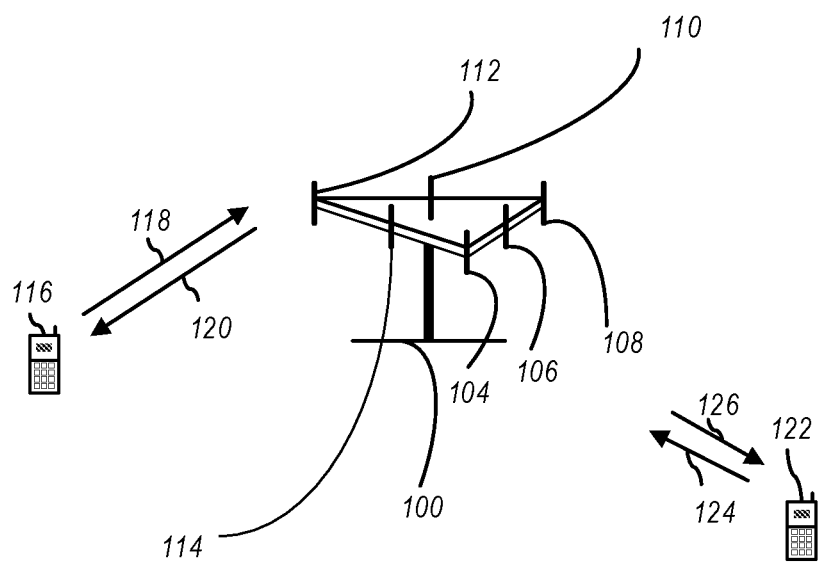
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
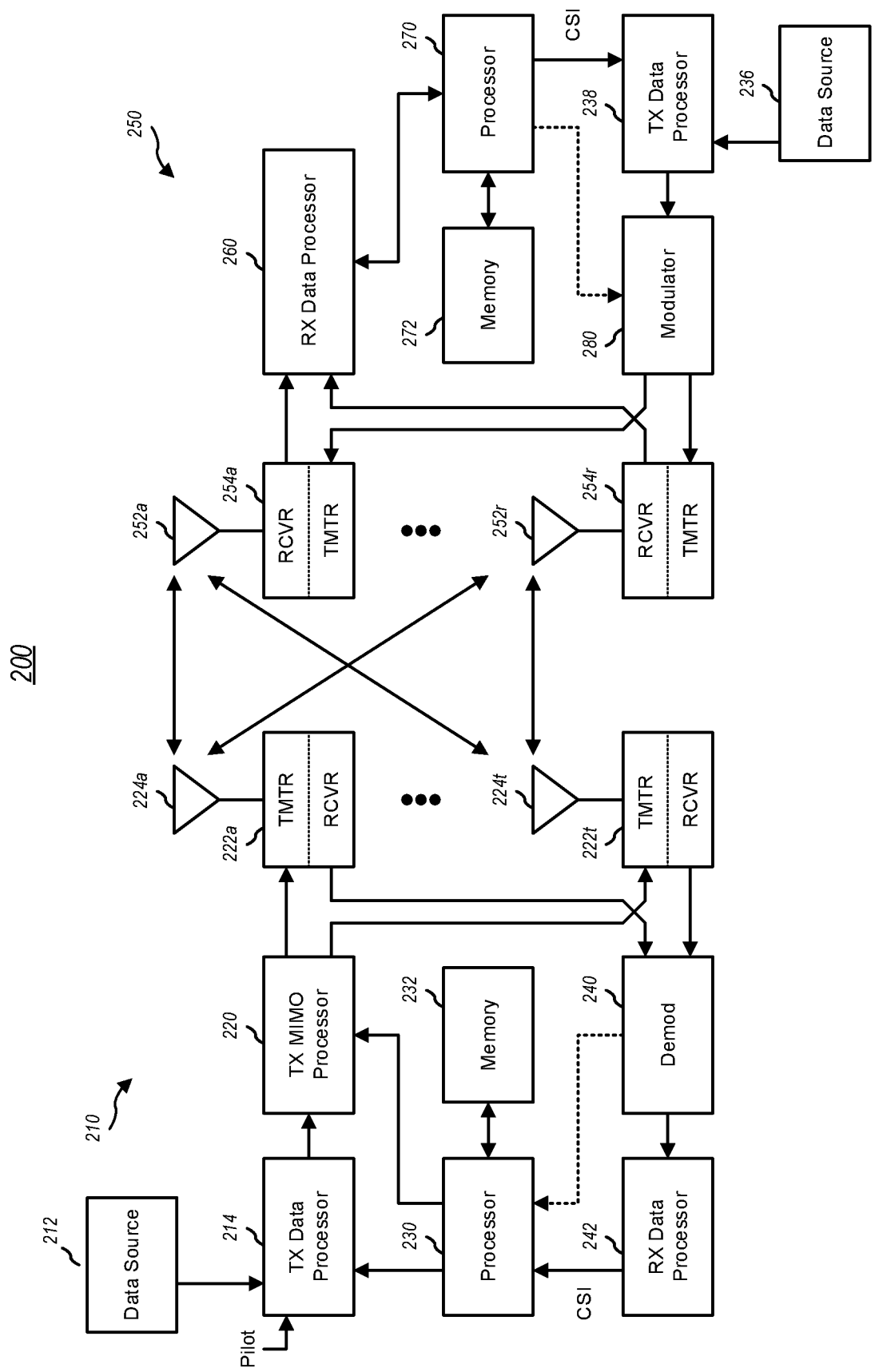
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
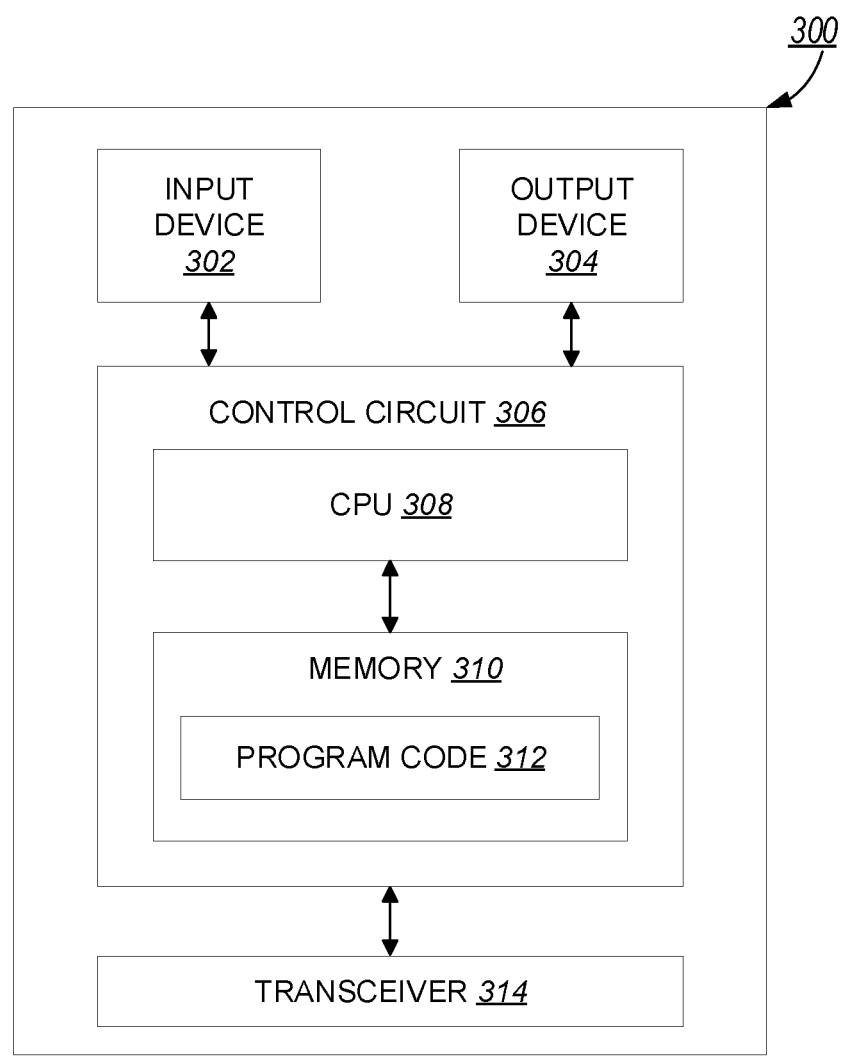
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
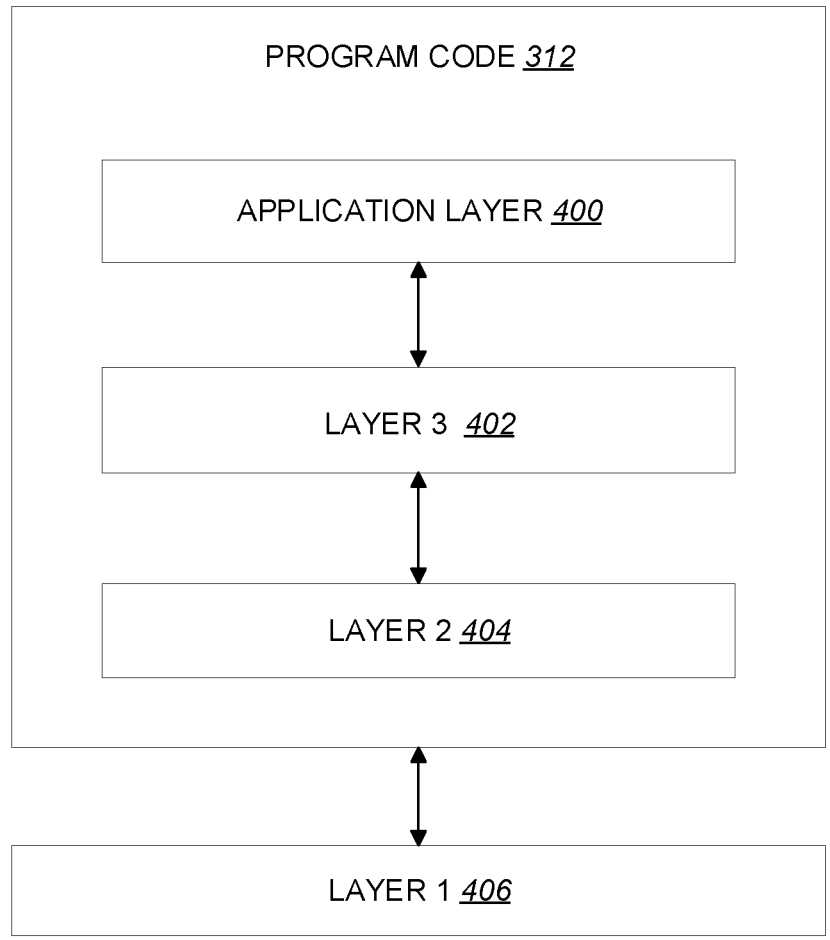
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In 3GPP meeting, R1-1908917 introduces sidelink CSI-RS reporting related procedure. Parts of R1-1908917 are quoted below:

Sidelink CSI Report and Sidelink CSI-RS

In this section, we further discuss the details of CSI acquisition for sidelink unicast, including CSI report and the corresponding sidelink CSI-RS (SCSI-RS). The focus in this paper is on CSI report over SL.

4.1 Sidelink CSI Report Procedures

As agreed during SI, non-subband-based RI and CQI reports will be supported for sidelink unicast. In NR Uu transmissions, typically one RI value and the associated PMI and/or CQI are reported, where RI represents the maximum possible transmission rank of the measured channel. However, this may not be suitable for V2X applications which have diverse service requirements in terms of data rate and reliability. More specifically, some NR eV2X use cases may target high data rate while others target high reliability. On the other hand, single unicast connection will be established between the transmitter UE and the receiver UE which may carry different V2X services. Accordingly, to satisfy the diverse requirements, some services are interested in multi-layer transmissions while other services are interested in single layer transmissions. However, when the receiver reports CSI parameters, it is typically not aware of the transmitter's interest, e.g., the transmission requirement. In this case, it is beneficial to report multiple CQI values associated with different RI values respectively, which gives the transmitter the flexibility to select more proper transmission parameters based on its own needs.

One sidelink CSI report may include multiple CQIs associated with different RIs respectively.

Since it has been agreed to support up to two antenna ports, the rank of a PSSCH transmission can only be either 1 or 2. Hence, 1 bit is enough for RI. Moreover, for one CQI report, within a given CQI table, 4 bits are enough as in NR Uu. In this way, SL CSI report size is 5 bits when reporting one RI and its associated CQI. SL CSI report size is 9 bits when report two CQIs associated with rank-1 and rank-2 respectively.

SL CSI report size is up to 9 bits for NR Rel-16.

Furthermore, it has been clarified in WID that for sidelink unicast, CSI is delivered using PSSCH (including PSSCH containing CSI only) using the resource allocation procedure for data transmission. Note that for a single UE, it is possible to have two scenarios:

1) CSI report only transmission;
2) Simultaneous CSI report and data transmissions.

In general, there are two ways to carry CSI report over SL.

Option 1: Carry as a separate MAC CE or an RRC message,

Option 2: Piggybacked in PSSCH as the way of carrying UCI over PUSCH.

We see some drawbacks of option 2. First, a proper piggyback design requires a large amount of simulations to evaluate various RE mappings and β offset values, which is quite challenging given the limited WID time. Second, and more importantly, piggyback solution is not good for forward compatibility, since in a later release we may have more CSI report parameters and thus a larger CSI report size. In that case, the current RE mappings and β offset values may not be valid anymore. Third, piggybacking in PSSCH implies that coding similar to UL polar code is used for CSI reporting which is not favourable as every UE will have to implement the corresponding codec. Therefore, we believe that only option 1 should be supported.

SL CSI report piggyback on PSSCH is not supported.

SL CSI report is carried in a TB on PSSCH.

When it comes to MAC CE and RRC, we think that MAC CE is more flexible compared to RRC. First consider the scenario where a UE has both data and CSI report targeting the same receiver UE. If MAC CE is used to carry CSI report, data and CSI report can be formed as either one TB (i.e., one PSSCH) or two separate TBs (i.e., two PSSCHs). On the other hand, if RRC is used to carry CSI report, data and CSI report can only be formed as two separate TBs (i.e., two PSSCHs). Furthermore, if CSI report is carried via MAC CE with its specifically configured LCID, no additional signalling in SCI is needed to indicate the presence of SL CSI report in the TB transmission. In addition, when a UE has only CSI report to transmit or a UE's data and CSI report targets different UEs, the UE can form two separate TBs, irrespective of CSI report carried by MAC CE or RRC.

For carrying CSI report over sidelink, MAC CE is more flexible compared to RRC.

Whether MAC CE or RRC is eventually used to carry CSI report, we think that it is in RAN2 domain and RAN1 leaves it up to RAN2 to decide. Furthermore, prioritization between CSI report and data transmissions should also be done and is also specified by RAN2. It is up to RAN2 to decide if MAC CE or RRC message is used to carry CSI reports and the respective details specific to the solution.

For aperiodic CSI-report triggering, the TX UE can trigger sidelink report when it is needed, e.g., to perform link adaptation, adaptation of transmission layers, etc. For this purpose, the TX UE can include an indication in SCI to trigger the CSI report from the RX UE.

An indication in SCI is used to trigger sidelink CSI report from the RX UE.

4.2 Sidelink CSI-RS Procedures

It has been agreed in RAN1 #96bis to support sidelink CSI-RS for CQI/RI measurement, where CSI-RS is confined with the PSSCH transmission.

The SCSI-RS should be designed in such a way that it facilitates CSIT acquisition either in a reciprocity-based manner and/or in a feedback-based manner. Specifically, when channel reciprocity can be exploited, CSIT can be obtained using SCSI-RS transmitted by the peer UE. On the other hand, when channel reciprocity does not hold, SCSI-RS can be used to measure the channel and/or the interference which are then reported back to the transmitter to facilitate CSIT acquisition, which is considered as SL CSI report. Since SCSI-RS may or may not be present in a slot, we can use the SCI transmitted over PSCCH to indicate its presence.

The presence of SCSI-RS in a slot is indicated by an SCI carried by the PSCCH.

In RAN1 #96 meeting, RAN1 has some agreements, shown in R1-1905837, regarding Sidelink Reference Signal Received Power (SL-RSRP) report associated with NR Vehicle-to-Everything (V2X). Parts of R1-1905837 are quoted below:

Agreements:
For unicast RX UEs, SL-RSRP is reported to TX UE
For sidelink open loop power control for unicast for the TX UE, TX UE derives pathloss estimation
   Revisit during the WI phase w.r.t. whether or not there is a need regarding how to handle pathloss estimation for OLPC before SL-RSRP is available for a RX UE
Agreements:
TPC commands for SL PC are not supported
R1-1903597
Agreements:
For sidelink groupcast, it is supported to use TX-RX distance and/or RSRP in deciding whether to send HARQ feedback.
   Details to be discussed during WI phase, including whether the information on TX-RX distance is explicitly signaled or implicitly derived, whether/how this operation is related to resource allocation, accuracy of distance and/or RSRP, the aspects related to "and/or", etc.
   This feature can be disabled/enabled In RAN1 #98bis meeting, RAN1 has some agreements, shown in Draft Report of 3GPP TSG RAN WG1 #98bis v0.1.0, regarding NR V2X. Parts of Draft Report of 3GPP TSG RAN WG1 #98bis v0.1.0 are quoted below:

Agreements:
L3-filtered sidelink RSRP reporting (from RX UE to TX UE) for open-loop power control for PSCCH/PSSCH uses higher layer signaling.
   Details (e.g., reporting layer, triggering condition, etc.) are up to RAN2.
   FFS: Other details
Agreements:
For SL-RSRP measurement for SL open-loop power control, PSSCH DMRS is used
Agreements:
For CQI/RI reporting on PSSCH:
   Higher layer signaling (e.g. MAC CE) is used for CQI/RI reporting
      Details up to RAN2
   SL CQI/RI measurement and derivation are based on the existing physical layer procedure for Uu 3GPP TS 36.321 V 15.7.0 discusses sidelink resource allocation and utilization mechanism in current Medium Access Control (MAC) specification, including logical channel prioritization for sidelink V2X. Parts of 3GPP TS 36.321 V 15.7.0 are quoted below:

5.14 SL-SCH Data Transfer
5.14.1 SL-SCH Data Transmission
5.14.1.1 SL Grant Reception and SCI Transmission
In order to transmit on the SL-SCH the MAC entity must have at least one sidelink grant.

Sidelink grants are selected as follows for sidelink communication:
   if the MAC entity is configured to receive a single sidelink grant dynamically on the PDCCH and more data is available in STCH than can be transmitted in the current SC period, the MAC entity shall:
      using the received sidelink grant determine the set of subframes in which transmission of SCI and transmission of first transport block occur according to subclause 14.2.1 of [2];
      consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;
      clear the configured sidelink grant at the end of the corresponding SC Period;
   else, if the MAC entity is configured by upper layers to receive multiple sidelink grants dynamically on the PDCCH and more data is available in STCH than can be transmitted in the current SC period, the MAC entity shall for each received sidelink grant:
      using the received sidelink grant determine the set of subframes in which transmission of SCI and transmission of first transport block occur according to subclause 14.2.1 of [2];
      consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;
      clear the configured sidelink grant at the end of the corresponding SC Period;
   else, if the MAC entity is configured by upper layers to transmit using one or multiple pool(s) of resources as indicated in subclause 5.10.4 of [8] and more data is available in STCH than can be transmitted in the current SC period, the MAC entity shall for each sidelink grant to be selected:
   if configured by upper layers to use a single pool of resources:
      select that pool of resources for use;
   else, if configured by upper layers to use multiple pools of resources:
      select a pool of resources for use from the pools of resources configured by upper layers whose associated priority list includes the priority of the highest priority of the sidelink logical channel in the MAC PDU to be transmitted;
      NOTE: If more than one pool of resources has an associated priority list which includes the priority of the sidelink logical channel with the highest priority in the MAC PDU to be transmitted, it is left for UE implementation which one of those pools of resources to select.
   randomly select the time and frequency resources for SL-SCH and SCI of a sidelink grant from the selected resource pool. The random function shall be such that each of the allowed selections [2] can be chosen with equal probability;

use the selected sidelink grant to determine the set of subframes in which transmission of SCI and transmission of first transport block occur according to subclause 14.2.1 of [2];

consider the selected sidelink grant to be a configured sidelink grant occurring in those subframes starting at the beginning of the first available SC Period which starts at least 4 subframes after the subframe in which the sidelink grant was selected;

clear the configured sidelink grant at the end of the corresponding SC Period;

NOTE: Retransmissions on SL-SCH cannot occur after the configured sidelink grant has been cleared.

NOTE: If the MAC entity is configured by upper layers to transmit using one or multiple pool(s) of resources as indicated in subclause 5.10.4 of [8], it is left for UE implementation how many sidelink grants to select within one SC period taking the number of sidelink processes into account.

Sidelink grants are selected as follows for V2X sidelink communication:

if the MAC entity is configured to receive a sidelink grant dynamically on the PDCCH and data is available in STCH, the MAC entity shall:

use the received sidelink grant to determine the number of HARQ retransmissions and the set of subframes in which transmission of SCI and SL-SCH occur according to subclause 14.2.1 and 14.1.1.4A of [2];

consider the received sidelink grant to be a configured sidelink grant;

if the MAC entity is configured by upper layers to receive a sidelink grant on the PDCCH addressed to SL Semi-Persistent Scheduling V-RNTI, the MAC entity shall for each SL SPS configuration:

if PDCCH contents indicate SPS activation:

use the received sidelink grant to determine the number of HARQ retransmissions and the set of subframes in which transmission of SCI and SL-SCH occur according to subclause 14.2.1 and 14.1.1.4A of [2];

consider the received sidelink grant to be a configured sidelink grant;

if PDCCH contents indicate SPS release:

clear the corresponding configured sidelink grant;

if the MAC entity is configured by upper layers to transmit using pool(s) of resources in one or multiple carriers as indicated in subclause 5.10.13.1 of [8] based on sensing, or partial sensing, or random selection only if upper layers indicates that transmissions of multiple MAC PDUs are allowed according to subclause 5.10.13.1a of [8], and the MAC entity selects to create a configured sidelink grant corresponding to transmissions of multiple MAC PDUs, and data is available in STCH associated with one or multiple carriers, the MAC entity shall for each Sidelink process configured for multiple transmissions on a selected carrier according to subclause 5.14.1.5:

if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or if neither transmission nor retransmission has been performed by the MAC entity on any resource indicated in the configured sidelink grant during the last second; or if sl-ReselectAfter is configured and the number of consecutive unused transmission opportunities on resources indicated in the configured sidelink grant is equal to sl-ReselectAfter; or if there is no configured sidelink grant; or if the configured sidelink grant cannot accommodate a RLC SDU by using the maximum allowed MCS configured by upper layers in maxMCS-PSSCH and the MAC entity selects not to segment the RLC SDU; or NOTE: If the configured sidelink grant cannot accommodate the RLC SDU, it is left for UE implementation whether to perform segmentation or sidelink resource reselection.

if transmission(s) with the configured sidelink grant cannot fulfil the latency requirement of the data in a sidelink logical channel according to the associated PPPP, and the MAC entity selects not to perform transmission(s) corresponding to a single MAC PDU; or NOTE: If the latency requirement is not met, it is left for UE implementation whether to perform transmission(s) corresponding to single MAC PDU or sidelink resource reselection.

if a pool of resources is configured or reconfigured by upper layers for the selected carrier:

clear the configured sidelink grant, if available;

trigger the TX carrier (re-)selection procedure as specified in sub-clause 5.14.1.5;

if the carrier is (re-)selected in the Tx carrier (re-)selection according to sub-clause 5.14.1.5, the following is performed on the selected carrier:

select one of the allowed values configured by upper layers in restrictResourceReservationPeriod and set the resource reservation interval by multiplying 100 with the selected value;

NOTE: How the UE selects this value is up to UE implementation.

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSubchannel-NumberPSSCH included in pssch- TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

if transmission based on random selection is configured by upper layers:

randomly select the time and frequency resources for one transmission opportunity from the resource pool, according to the amount of selected frequency resources. The random function shall be such that each of the allowed selections can be chosen with equal probability;

else:

randomly select the time and frequency resources for one transmission opportunity from the resources indicated by the physical layer according to subclause 14.1.1.6 of [2], according to the amount of selected frequency resources. The random function shall be such that each of the allowed selections can be chosen with equal probability;

use the randomly selected resource to select a set of periodic resources spaced by the resource reservation interval for transmission opportunities of SCI and SL-SCH corresponding to the number of transmission opportunities of MAC PDUs determined in subclause 14.1.1.4B of [2];

if the number of HARQ retransmissions is equal to 1 and there are available resources left in the resources indicated by the physical layer that meet the conditions in subclause 14.1.1.7 of [2] for more transmission opportunities:

randomly select the time and frequency resources for one transmission opportunity from the available resources, according to the amount of selected frequency resources. The random function shall be such that each of the allowed selections can be chosen with equal probability;

use the randomly selected resource to select a set of periodic resources spaced by the resource reservation interval for the other transmission opportunities of SCI and SL-SCH corresponding to the number of retransmission opportunities of the MAC PDUs determined in subclause 14.1.1.4B of [2];

consider the first set of transmission opportunities as the new transmission opportunities and the other set of transmission opportunities as the retransmission opportunities;

consider the set of new transmission opportunities and retransmission opportunities as the selected sidelink grant.

else:

consider the set as the selected sidelink grant;

use the selected sidelink grant to determine the set of subframes in which transmissions of SCI and SL-SCH occur according to subclause 14.2.1 and 14.1.1.4B of [2];

consider the selected sidelink grant to be a configured sidelink grant;

else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

clear the configured sidelink grant, if available;

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

use the previously selected sidelink grant for the number of transmissions of the MAC PDUs determined in subclause 14.1.1.4B of [2] with the resource reservation interval to determine the set of subframes in which transmissions of SCI and SL-SCH occur according to subclause 14.2.1 and 14.1.1.4B of [2];

consider the selected sidelink grant to be a configured sidelink grant;

else, if the MAC entity is configured by upper layers to transmit using pool(s) of resources in one or multiple carriers as indicated in subclause 5.10.13.1 of [8], the MAC entity selects to create a configured sidelink grant corresponding to transmission(s) of a single MAC PDU, and data is available in STCH associated with one or multiple carriers, the MAC entity shall for a Sidelink process on a selected carrier according to subclause 5.14.1.5:

trigger the TX carrier (re-)selection procedure as specified in sub-clause 5.14.1.5;

if the carrier is (re-)selected in the Tx carrier (re-)selection according to sub-clause 5.14.1.5, the following is performed on the selected carrier:

select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

if transmission based on random selection is configured by upper layers:
  randomly select the time and frequency resources for one transmission opportunity of SCI and SL-SCH from the resource pool, according to the amount of selected frequency resources. The random function shall be such that each of the allowed selections can be chosen with equal probability;
else:
  randomly select the time and frequency resources for one transmission opportunity of SCI and SL-SCH from the resources indicated by the physical layer according to subclause 14.1.1.6 of [2], according to the amount of selected frequency resources. The random function shall be such that each of the allowed selections can be chosen with equal probability;
if the number of HARQ retransmissions is equal to 1:
  if transmission based on random selection is configured by upper layers and there are available resources that meet the conditions in subcause 14.1.1.7 of [2] for one more transmission opportunity:
    randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
  else, if transmission based on sensing or partial sensing is configured by upper layers and there are available resources left in the resources indicated by the physical layer that meet the conditions in subcause 14.1.1.7 of [2] for one more transmission opportunity:
    randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
  consider a transmission opportunity which comes first in time as the new transmission opportunity and a transmission opportunity which comes later in time as the retransmission opportunity;
  consider both of the transmission opportunities as the selected sidelink grant;
else:
  consider the transmission opportunity as the selected sidelink grant;
use the selected sidelink grant to determine the subframes in which transmission(s) of SCI and SL-SCH occur according to subclause 14.2.1 and 14.1.1.4B of [2];
consider the selected sidelink grant to be a configured sidelink grant.
NOTE: For V2X sidelink communication, the UE should ensure the randomly selected time and frequency resources fulfill the latency requirement.
NOTE: For V2X sidelink communication, when there is no overlapping between the chosen configuration(s) in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.

The MAC entity shall for each subframe:
if the MAC entity has a configured sidelink grant occurring in this subframe:
  if SL_RESOURCE_RESELECTION_COUNTER=1 and the MAC entity randomly selected, with equal probability, a value in the interval [0, 1] which is above the probability configured by upper layers in probResourceKeep:
    set the resource reservation interval equal to 0;
  if the configured sidelink grant corresponds to transmission of SCI:
    for V2X sidelink communication in UE autonomous resource selection:
      select a MCS which is, if configured, within the range that is configured by upper layers between minMCS-PSSCH and maxMCS-PSSCH included in pssch-TxConfigList and, if configured by upper layers, overlapped between minMCS-PSSCH and maxMCS-PSSCH indicated in cbr-pssch-TxConfigList for the highest priority of the sidelink logical channel(s) in the MAC PDU and the CBR measured by lower layers according to [6] if CBR measurement results are available or the corresponding defaultTxConfigIndex configured by upper layers if CBR measurement results are not available;
      NOTE: MCS selection is up to UE implementation if the MCS or the corresponding range is not configured by upper layers.
      NOTE: For V2X sidelink communication, when there is no overlapping between the chosen configuration(s) included in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.
    for V2X sidelink communication in scheduled resource allocation:
    select a MCS unless it is configured by upper layer;
    instruct the physical layer to transmit SCI corresponding to the configured sidelink grant;
    for V2X sidelink communication, deliver the configured sidelink grant, the associated HARQ information and the value of the highest priority of the sidelink logical channel(s) in the MAC PDU to the Sidelink HARQ Entity for this subframe;
  else if the configured sidelink grant corresponds to transmission of first transport block for sidelink communication:
    deliver the configured sidelink grant and the associated HARQ information to the Sidelink HARQ Entity for this subframe.
    NOTE: If the MAC entity has multiple configured grants occurring in one subframe and if not all of them can be processed due to the single-cluster SC-FDM restriction, it is left for UE implementation which one of these to process according to the procedure above.

5.14.1.2 Sidelink HARQ Operation

5.14.1.2.1 Sidelink HARQ Entity

The MAC entity is configured by upper layers to transmit using pool(s) of resources on one or multiple carriers as indicated in subclause 5.10.13.1 of 3GPP TS 36.331 [8], there is one Sidelink HARQ Entity at the MAC entity for each carrier for transmission on SL-SCH, which maintains a number of parallel Sidelink processes.

For sidelink communication, the number of transmitting Sidelink processes associated with the Sidelink HARQ Entity is defined in [8].

For V2X sidelink communication, the maximum number of transmitting Sidelink processes associated with each Sidelink HARQ Entity is 8. A sidelink process may be configured for transmissions of multiple MAC PDUs. For transmissions of multiple MAC PDUs, the maximum number of transmitting Sidelink processes associated with each Sidelink HARQ Entity is 2.

A delivered and configured sidelink grant and its associated HARQ information are associated with a Sidelink process.

For each subframe of the SL-SCH and each Sidelink process, the Sidelink HARQ Entity shall:
if a sidelink grant corresponding to a new transmission opportunity has been indicated for this Sidelink process and there is SL data, for sidelink logical channels of ProSe destination associated with this sidelink grant, available for transmission:
  obtain the MAC PDU from the "Multiplexing and assembly" entity;
  deliver the MAC PDU and the sidelink grant and the HARQ information to this Sidelink process;
  instruct this Sidelink process to trigger a new transmission.
else, if this subframe corresponds to retransmission opportunity for this Sidelink process:
  instruct this Sidelink process to trigger a retransmission.
    NOTE: The resources for retransmission opportunities are specified in subclause 14.2.1 of [2] unless specified in subclause 5.14.1.1.

5.14.1.2.2 Sidelink Process

The Sidelink process is associated with a HARQ buffer.

The sequence of redundancy versions is 0, 2, 3, 1. The variable CURRENT_IRV is an index into the sequence of redundancy versions. This variable is updated modulo 4.

New transmissions and retransmissions either for a given SC period in sidelink communication or in V2X sidelink communication are performed on the resource indicated in the sidelink grant as specified in subclause 5.14.1.1 and with the MCS selected as specified in subclause 5.14.1.1.

If the sidelink process is configured to perform transmissions of multiple MAC PDUs for V2X sidelink communication the process maintains a counter SL_RESOURCE_RESELECTION_COUNTER. For other configurations of the sidelink process, this counter is not available.

If the Sidelink HARQ Entity requests a new transmission, the Sidelink process shall:
set CURRENT_IRV to 0;
store the MAC PDU in the associated HARQ buffer;
store the sidelink grant received from the Sidelink HARQ Entity;
generate a transmission as described below.

If the Sidelink HARQ Entity requests a retransmission, the Sidelink process shall:
generate a transmission as described below.
To generate a transmission, the Sidelink process shall:
if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and
if there is no Sidelink Discovery Gap for Transmission or no transmission on PSDCH at the time of the transmission; or, in case of transmissions of V2X sidelink communication, if the MAC entity is able to perform transmissions on SL-SCH and transmissions on PSDCH simultaneously at the time of the transmission:
  instruct the physical layer to generate a transmission according to the stored sidelink grant with the redundancy version corresponding to the CURRENT_IRV value.
increment CURRENT_IRV by 1;
if this transmission corresponds to the last transmission of the MAC PDU:
  decrement SL_RESOURCE_RESELECTION_COUNTER by 1, if available.

The transmission of V2X sidelink communication is prioritized over uplink transmission if the following conditions are met:
if the MAC entity is not able to perform uplink transmissions and transmissions of V2X sidelink communication simultaneously at the time of the transmission; and
if uplink transmission is not prioritized by upper layer according to [15]; and
if the value of the highest priority of the sidelink logical channel(s) in the MAC PDU is lower than thresSL-TxPrioritization if thresSL-TxPrioritization is configured.

5.14.1.3 Multiplexing and Assembly

For PDU(s) associated with one SCI, MAC shall consider only logical channels with the same Source Layer-2 ID-Destination Layer-2 ID pair.

Multiple transmissions within overlapping SC periods to different ProSe Destinations are allowed subject to single-cluster SC-FDM constraint.

In V2X sidelink communication, multiple transmissions for different Sidelink processes are allowed to be independently performed in different subframes.

5.14.1.3.1 Logical Channel Prioritization

The Logical Channel Prioritization procedure is applied when a new transmission is performed. Each sidelink logical channel has an associated priority which is the PPPP and optionally an associated PPPR. Multiple sidelink logical channels may have the same associated priority. The mapping between priority and LCID is left for UE implementation. If duplication is activated as specified in TS 36.323 [4], the MAC entity shall map different sidelink logical channels which correspond to the same PDCP entity onto different carriers in accordance with clause 5.14.1.5, or onto different carriers of different carrier sets (if configured in allowedCarrierFreqList for the corresponding destination). For a given sidelink logical channel, it is up to UE implementation which carrier set to select among the carrier sets configured in allowedCarrierFreqList (if configured) for the corresponding destination.

The MAC entity shall perform the following Logical Channel Prioritization procedure either for each SCI transmitted in an SC period in sidelink communication, or for each SCI corresponding to a new transmission in V2X sidelink communication:

The MAC entity shall allocate resources to the sidelink logical channels in the following steps:
  Only consider sidelink logical channels not previously selected for this SC period and the SC periods (if any) which are overlapping with this SC period, to have data available for transmission in sidelink communication;
  Only consider sidelink logical channels which meet the following conditions:
    allowed on the carrier where the SCI is transmitted for V2X sidelink communication, if the carrier is configured by upper layers according to TS 36.331 [8] and TS 24.386 [15];
    having a priority whose associated threshCBR-FreqReselection is no lower than the CBR of the carrier when the carrier is (re-)selected in accordance with 5.14.1.5;
  Only consider one sidelink logical channel among sidelink logical channels corresponding to same PDCP entity, if duplication is activated as specified in TS 36.323 [4].
  Step 0: Select a ProSe Destination, having the sidelink logical channel with the highest priority, among the sidelink logical channels having data available for transmission and having the same transmission format as the one selected corresponding to the ProSe Destination;
    NOTE: The sidelink logical channels belonging to the same ProSe Destination have the same transmission format.
  For each MAC PDU associated to the SCI:
    Step 1: Among the sidelink logical channels belonging to the selected ProSe Destination and having data available for transmission, allocate resources to the sidelink logical channel with the highest priority;
    Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.
  The UE shall also follow the rules below during the scheduling procedures above:
    the UE should not segment an RLC SDU (or partially transmitted SDU) if the whole SDU (or partially transmitted SDU) fits into the remaining resources;
    if the UE segments an RLC SDU from the sidelink logical channel, it shall maximize the size of the segment to fill the grant as much as possible;
    the UE should maximise the transmission of data;
    if the MAC entity is given a sidelink grant size that is equal to or larger than 10 bytes (for sidelink communication) or 11 bytes (for V2X sidelink communication) while having data available for transmission, the MAC entity shall not transmit only padding.

5.14.1.3.2 Multiplexing of MAC SDUs

The MAC entity shall multiplex MAC SDUs in a MAC PDU according to clauses 5.14.1.3.1 and 6.1.6.

Agreements for NR V2X are quoted below from 3GPP RAN1#94 chairman's note:
Agreements:
At least two sidelink resource allocation modes are defined for NR-V2X sidelink communication
  Mode 1: Base station schedules sidelink resource(s) to be used by UE for sidelink transmission(s)
  Mode 2: UE determines (i.e. base station does not schedule) sidelink transmission resource(s) within sidelink resources configured by base station/network or pre-configured sidelink resources
Notes:
eNB control of NR sidelink and gNB control of LTE sidelink resources will be separately considered in corresponding agenda items.
Mode-2 definition covers potential sidelink radio-layer functionality or resource allocation sub-modes (subject to further refinement including merging of some or all of them) where
  a) UE autonomously selects sidelink resource for transmission
  b) UE assists sidelink resource selection for other UE(s)
  c) UE is configured with NR configured grant (type-1 like) for sidelink transmission
  d) UE schedules sidelink transmissions of other UEs
RAN1 to continue study details of resource allocation modes for NR-V2X sidelink communication Agreements for NR V2X are quoted below from 3GPP RAN1#98bis chairman's note:
Agreements:
L3-filtered sidelink RSRP reporting (from RX UE to TX UE) for open-loop power control for PSCCH/PSSCH uses higher layer signaling.
  Details (e.g., reporting layer, triggering condition, etc.) are up to RAN2.
  FFS: Other details
Agreements:
For SL-RSRP measurement for SL open-loop power control, PSSCH DMRS is used
Agreements:
For CQI/RI reporting on PSSCH:
  Higher layer signaling (e.g. MAC CE) is used for CQI/RI reporting
  Details up to RAN2
  SL CQI/RI measurement and derivation are based on the existing physical layer procedure for Uu
Agreements:
SL CSI-RS is transmitted by a UE only if:
  when the corresponding PSSCH is transmitted (as agreed before) by the UE, and,
  when SL CQI/RI reporting is enabled by higher layer signaling, and
  when enabled, if the corresponding SCI by the UE triggers the SL CQI/RI reporting Some or all of the following terminology and assumptions may be used hereafter.
  BS: a network central unit and/or a network node in New Radio Access Technology (NR) which is used to control one or more transmission and reception points (TRPs) which are associated with one or more cells. Communication between BS and TRP(s) is via fronthaul. BS may be referred to as central unit (CU), eNB, gNB, and/or NodeB.
  TRP: a TRP provides network coverage and directly communicates with UEs. TRP may be referred to as distributed unit (DU) and/or network node.
  Cell: a cell is composed of one or more associated TRPs, i.e. coverage of the cell is composed of coverage of some and/or all associated TRP(s). One cell is controlled by one BS. Cell may be referred to as TRP group (TRPG).

NR-Physical Downlink Control Channel (PDCCH): A channel carries downlink control signal which is used to control communication between a UE and a network side. A network transmits NR-PDCCH on a configured control resource set (CORESET) to the UE.

Uplink-control signal (UL-control signal): A UL-control signal may be at least one of scheduling request (SR), Channel State Information (CSI), Hybrid Automatic Repeat reQuest (HARQ)-Acknowledgement (HARQ-ACK) and/or HARQ-Negative Acknowledgement (HARQ-NACK) for downlink transmission, etc.

Slot: a scheduling unit in NR. Slot duration may be 14 OFDM symbols.

Mini-slot: a scheduling unit with a duration of less than 14 OFDM symbols.

Slot format information (SFI): Information of slot format of symbols in a slot. A symbol in a slot may belong to following type: downlink, uplink, unknown or other. The slot format of a slot could at least convey transmission direction of symbols in the slot.

DL common signal: data channel carrying common information that targets for multiple UEs in a cell and/or some and/or all UEs in a cell. Example of DL common signal may be at least one of system information, paging, Random Access Response (RAR), etc.

For network side:

Downlink timing of TRPs in the same cell are synchronized.

Radio Resource Control (RRC) layer of network side is in BS.

For UE side:

There are at least two UE (RRC) states: connected state (also called active state) and non-connected state (also called inactive state and/or idle state). Inactive state may be an additional state and/or belong to connected state and/or non-connected state.

To increase reliability, provide for high reliability and/or reduce interference, NR Vehicle-to-Everything (V2X) provides support for a receiver UE (RX UE) to report SL-RSRP (e.g., L3-filtered SL-RSRP) to a transmitter UE (TX UE) in unicast (e.g., such support is discussed in Draft Report of 3GPP TSG RAN WG1 #98bis v0.1.0). The TX UE may determine sidelink pathloss between the TX UE and the RX UE based upon the reported SL-RSRP. The sidelink pathloss may be derived as the power difference between transmit power and the reported SL-RSRP.

In NR sidelink V2X, sidelink measurement report signaling (e.g., sidelink Channel Quality Indicator (CQI) measurement report signaling via PC5 interface and/or sidelink Rank Indicator (RI) measurement report signaling via PC5 interface) is supported (e.g., such support is discussed in Draft Report of 3GPP TSG RAN WG1 #98bis v0.1.0). A TX UE may transmit, to a RX UE, a sidelink Channel State Information-Reference Signal (SL CSI-RS) with a trigger indication for sidelink reporting (e.g., an indication that triggers sidelink reporting, such as sidelink CQI reporting and/or sidelink RI reporting) in a corresponding Sidelink Control Information (SCI), wherein the SL CSI-RS is transmitted with a corresponding Physical Sidelink Shared Channel (PSSCH) scheduled by the corresponding SCI (e.g., such operation is discussed in 3GPP RAN1#98bis chairman's note). Accordingly, the RX UE may perform measurement and/or derivation of SL CQI and/or SL RI based upon the SL CSI-RS. The RX UE may deliver a derived value (e.g., a derived CQI value and/or a derived RI value) to a higher layer. The higher layer of the RX UE may generate higher layer signaling (e.g., a Medium Access Control (MAC) Control Element (CE) or a RRC message for CQI/RI reporting) for reporting the derived value (e.g., such operation is discussed in 3GPP RAN1#98bis chairman's note), and then deliver the higher layer signaling and/or sidelink data to a physical layer of the RX UE. The RX UE may transmit a sidelink transmission, comprising the higher layer signaling and/or the sidelink data, to the TX UE. When the TX UE receives the sidelink transmission and/or acquires the CQI value and/or the RI value from the higher layer signaling, the TX UE may perform link adaption and/or may adjust one or more transmission parameters (e.g., at least one of Modulation and Coding Scheme (MCS), layer selection, antenna/beam selection, code rate, modulation order, etc.) for one or more (e.g., subsequent) sidelink communications from the TX UE to the RX UE.

To support reporting of Reference Signal Received Power (RSRP) (e.g., L3-filtered RSRP) and/or Channel State Information (CSI) report (e.g., CQI and/or RI reporting), there is a need to utilize higher layer signaling to report measurement results. The measurement results may be RSRP (e.g., L1 filtered RSRP and/or L3 filtered RSRP). The higher layer signaling may be a MAC CE for RSRP reporting. Alternatively and/or additionally, the higher layer signaling may be a RRC message for RSRP reporting. In some examples, the measurement results may be channel state information (CSI). The CSI may comprise CQI, RI, and/or Pre-coding Matrix Indicator (PMI). The higher layer signaling may be a MAC CE for CSI reporting. Alternatively and/or additionally, the higher layer signaling may be a RRC message for CSI reporting. Reporting of other types of measurement results is possible, such as where there is a benefit to reporting the other types of measurement results for sidelink communication (e.g., the other types of measurement results may correspond to at least one of sidelink Buffer Status Report (BSR), sidelink Power Headroom Report (PHR), and/or sidelink channel sensing result. In some examples, the higher layer signaling may not be associated with a sidelink logical channel. Alternatively and/or additionally, the higher layer signaling may not be associated with a priority. Alternatively and/or additionally, the higher layer signaling may be associated with a priority (e.g., the higher layer signaling may be associated with a priority that is higher or lower than one or more priorities associated with one or more sidelink logical channels (LCHs)).

In LTE V2X, logical channel prioritization is supported. For each SCI corresponding to a new transmission in V2X sidelink communication, a TX UE may select a destination (such as for transmission) having a sidelink logical channel with a highest priority among sidelink logical channels having data available for transmission. The TX UE may then allocate resources to one or more sidelink logical channels associated with the selected destination.

Figure 5:
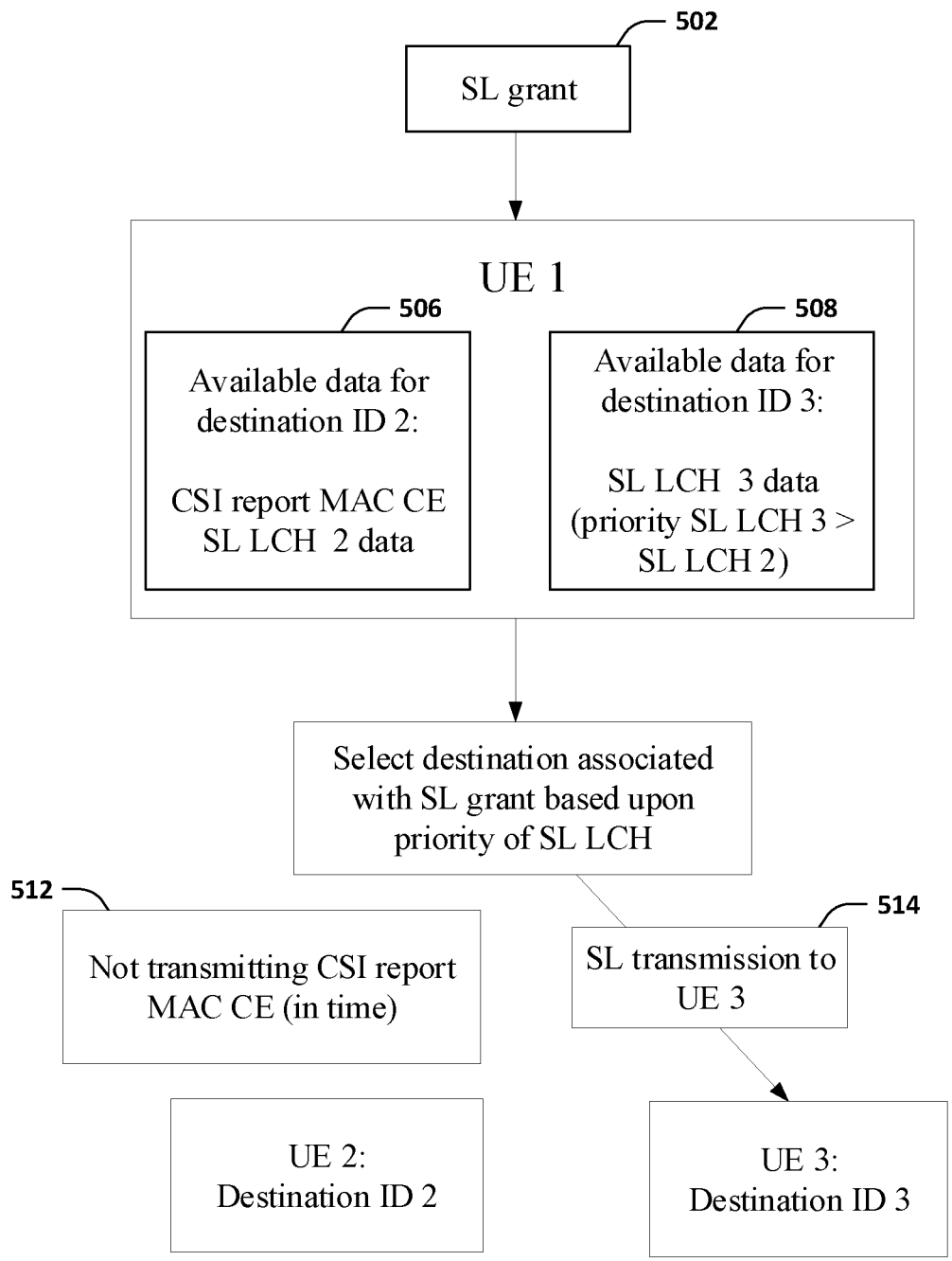
FIG. 5 is a diagram illustrating an exemplary scenario in which a first UE performs sidelink communication with a second UE and/or a third UE.

Some issues may occur if LTE V2X logical channel prioritization procedure is reused when selecting a destination for a sidelink resource for NR V2X considering a report associated with CQI, RI, CSI and/or RSRP may be transmitted in the form of MAC CE. Such an issue is illustrated in FIG. 5. FIG. 5 illustrates a scenario in which a first UE "UE 1" performs sidelink communication with a second UE "UE 2" and/or a third UE "UE 3". The sidelink communication may be unicast, groupcast and/or broadcast. The UE 2 and the UE 3 have different destination IDs (e.g., the UE 2 has a destination ID 2 and the UE 3 has a destination ID 3 that is different than the destination ID 2). The UE 1 may maintain two links for the UE 2 and the UE 3 respectively. The UE 1 may receive (and/or select) a sidelink grant 502 "SL grant" for sidelink transmission and may perform logical channel prioritization for selecting a destination associated with a SCI and/or the sidelink grant. Available data 506 that the UE 1 has for the UE 2 comprises sidelink data associated with SL LCH 2 (e.g., a sidelink logical channel associated with the UE 2) and a measurement report MAC CE (e.g., a MAC CE comprising a CSI report and/or a RSRP report) that is available for transmission (and/or a triggered measurement report (such as a CSI report and/or a RSRP report) that is pending for transmission). Available data 508 that the UE 1 has for the UE 3 comprises sidelink data associated with SL LCH 3 (e.g., a sidelink logical channel associated with the UE 3) available for transmission. The UE 1 may not be triggered to transmit a measurement report MAC CE (e.g., a MAC CE comprising a CSI report and/or a RSRP report) to the UE 3. However, if a priority of the SL LCH 3 is higher than a priority of the SL LCH 2, the UE 1 selects destination ID 3 for transmission associated with the sidelink grant without considering the measurement report MAC CE for the UE 2 that is available for transmission and/or pending for transmission. Thus, the UE 1 would perform a sidelink transmission 514 (based upon the sidelink grant 502) comprising SL LCH 3 data and/or the UE 1 would not perform 512 a transmission of the measurement report MAC CE for the UE 2. The measurement report MAC CE (for the UE 2) may require a second sidelink grant (other than the sidelink grant 502) for transmission. In NR sidelink mode-1, the UE 1 would inform a network via a scheduling request (SR) and/or a BSR to request the second sidelink grant, resulting in delay such as due to round trip time for requesting and/or obtaining the second sidelink grant. In NR sidelink mode-2, the UE 1 would need to select the second sidelink grant, requiring processing time for sensing and selecting one or more candidate resources for the second sidelink grant. Considering that channel quality between the UE 1 and the UE 2 may vary over time, the measurement report MAC CE (for the UE 2) may be outdated and/or may not accurately reflect current conditions when the UE 1 is able to transmit the measurement report MAC CE to the UE 2. Hence, considering that a MAC CE for transmission to a device via PC5 interface comprises latency-sensitive information (e.g., information that becomes outdated), logical channel prioritization (in NR Rel-15) needs to be enhanced.

Figure 6:
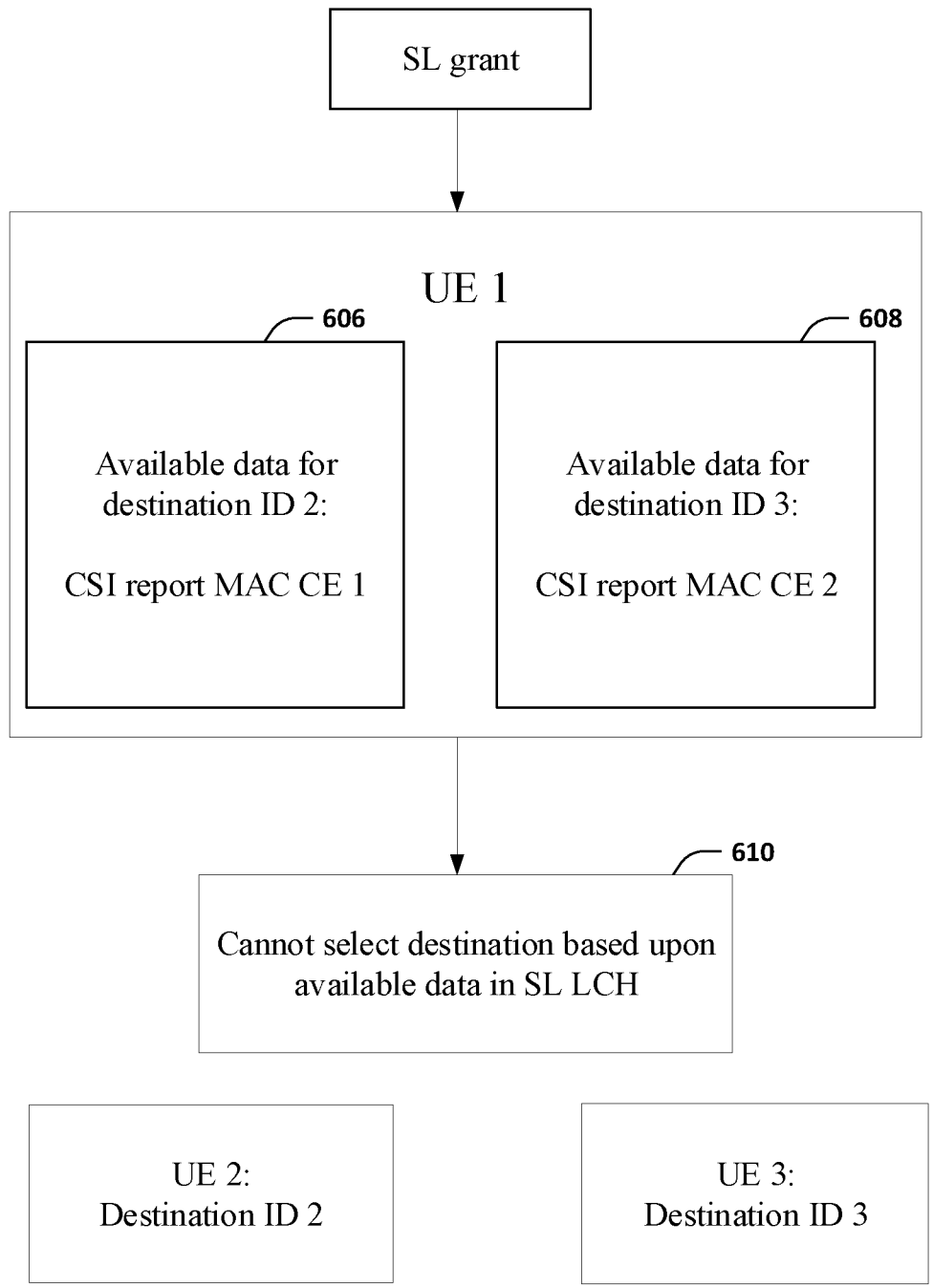
FIG. 6 is a diagram illustrating an exemplary scenario in which a first UE performs sidelink communication with a second UE and/or a third UE.

Another issue is illustrated in FIG. 6. FIG. 6 illustrates a scenario in which a first UE "UE 1" performs sidelink communication with a second UE "UE 2" and/or a third UE "UE 3". The sidelink communication may be unicast, groupcast and/or broadcast. The UE 2 and the UE 3 have different destination IDs (e.g., the UE 2 has a destination ID 2 and the UE 3 has a destination ID 3 that is different than the destination ID 2). The UE 1 has a pending measurement report (e.g., a CSI report and/or a RSRP report, such as in a MAC CE available for transmission) for both the UE 2 and the UE 3. For example, available data 606 that the UE 1 has for the UE 2 comprises a first measurement report MAC CE (e.g., a CSI report and/or a RSRP report shown as "CSI report MAC CE 1" in FIG. 6) that is available for transmission. Alternatively and/or additionally, available data 608 that the UE 1 has for the UE 3 comprises a second measurement report MAC CE (e.g., a CSI report and/or a RSRP report shown as "CSI report MAC CE 2" in FIG. 6) that is available for transmission. The UE 1 does not have sidelink data associated with sidelink logical channel available (at a time that the UE has the available data 606 for the UE 2 and the available data 608 for the UE 3). Using current logical channel prioritization procedure (in NR Rel-15), the UE 1 cannot 610 determine and/or select a destination for transmission since there are no sidelink logical channels with data available. Accordingly, using current logical channel prioritization procedure, the UE 1 may not transmit the first measurement report MAC CE and/or the second measurement report MAC CE. Additional mechanisms may be used in order to take sidelink MAC CE into consideration for sidelink communication.

In a first example concept of the present disclosure, when selecting a destination, associated with (and/or in response to) a sidelink grant and/or a SCI (in a logical channel prioritization procedure), from among one or more destinations, a UE may select a first destination associated with at least one report signaling over a second destination that is not associated with report signaling. For example, the UE may select the first destination for sidelink transmission associated with the sidelink grant and/or the SCI, such that the sidelink transmission associated with the sidelink grant and/or the SCI comprises transmission, to the first destination and/or to a device associated with the first destination, of available data for the first destination and/or the device (e.g., the available data may comprise a report signaling and/or sidelink data). The UE may determine whether to select the first destination or the second destination from among the one or more destinations based upon the report signaling (and/or based upon other information). In some examples, the report signaling for the first destination may have a higher priority than data (e.g., pending and/or available data) for the second destination. For example, the first destination may be selected for sidelink transmission (rather than the second destination, for example) based upon a determination that a priority of the report signaling for the first destination is higher than a priority of the data (e.g., the pending and/or available data) for the second destination. In some examples, at least one logical channel configured for the first destination may have a higher priority than the data (e.g., the pending and/or available data) for the second destination. For example, the first destination may be selected for sidelink transmission (rather than the second destination, for example) based upon a determination that the at least one logical channel configured for the first destination has a higher priority than the data (e.g., the pending and/or available data) for the second destination. The at least one logical channel configured for the first destination may or may not have pending and/or available data (for the first destination). In some examples, the priority of the data (e.g., the pending and/or available data) for the second destination is lower than a priority threshold. The priority threshold may be a configured (e.g., pre-configured) and/or specified priority threshold. For example, the first destination may be selected for sidelink transmission (rather than the second destination, for example) based upon a determination that the priority of the data (e.g., the pending and/or available data) for the second destination is lower than the priority threshold.

In some examples, when selecting a destination among the one or more destinations, the UE may identify and/or select the destination from among a first set of destinations, of the one or more destinations, that have at least one pending and/or triggered report signaling.

In some examples, the UE may select, from among the first set of destinations, a destination having a sidelink logical channel (e.g., a configured sidelink logical channel) with a highest priority among one or more priorities associated with one or more sidelink logical channels associated with the first set of destinations (e.g., the destination may be selected for sidelink transmission). The sidelink logical channel with the highest priority may or may not have data available for transmission.

Alternatively and/or additionally, a second set of destinations of the first set of destinations have sidelink logical channels (e.g., configured sidelink logical channels) with data available for transmission. The UE may select, from among the second set of destinations, a destination having a sidelink logical channel (e.g., a configured sidelink logical channel) that has data available for transmission and that has a highest priority among one or more priorities associated with one or more sidelink logical channels associated with second set of destinations (e.g., the destination may be selected for sidelink transmission).

Alternatively and/or additionally, a third set of destinations of the one or more destinations have sidelink logical channels that have data (e.g., sidelink data) available for transmission and that have matching priorities that are highest among priorities associated with sidelink logical channels associated with the one or more destinations and/or the first set of destinations (e.g., the matching priorities may be the same and/or equal to each other). In some examples, the UE may select, from among the third set of destinations, a destination that is associated with at least one pending and/or triggered report signaling (e.g., the destination may be selected for sidelink transmission). In some examples, the at least one pending and/or triggered report signaling associated with the selected destination may be associated with a priority that is higher than (or equal to) one or more priorities associated with one or more other destinations, other than the selected destination, of the third set of destinations (e.g., the one or more priorities may comprise one or more first priorities associated with one or more other pending and/or triggered report signalings associated with at least one of the one or more other destinations and/or one or more second priorities associated with sidelink data available for transmission for at least one of the one or more other destinations). For example, the UE may select the destination based upon a determination that the priority associated with the at least one pending and/or triggered report signaling associated with the destination is higher than (or equal to) the one or more priorities associated with the one or more other destinations of the third set of destinations.

In some examples, "at least one pending and/or triggered report signaling", as used herein with respect to describing embodiments of the first example concept, may correspond to a triggered sidelink CSI report.

In some examples, "at least one pending and/or triggered report signaling", as used herein with respect to describing embodiments of the first example concept, may correspond to a triggered sidelink RSRP report.

In some examples, "at least one pending and/or triggered report signaling", as used herein with respect to describing embodiments of the first example concept, may correspond to a sidelink CSI report MAC CE that is available for transmission.

In some examples, "at least one pending and/or triggered report signaling", as used herein with respect to describing embodiments of the first example concept, may correspond to a sidelink RSRP report MAC CE that is available for transmission.

In some examples, "at least one pending and/or triggered report signaling", as used herein with respect to describing embodiments of the first example concept, may be triggered in response to a SCI that is indicated (and/or transmitted) by a second UE associated with a destination of the one or more destinations.

Figure 7:
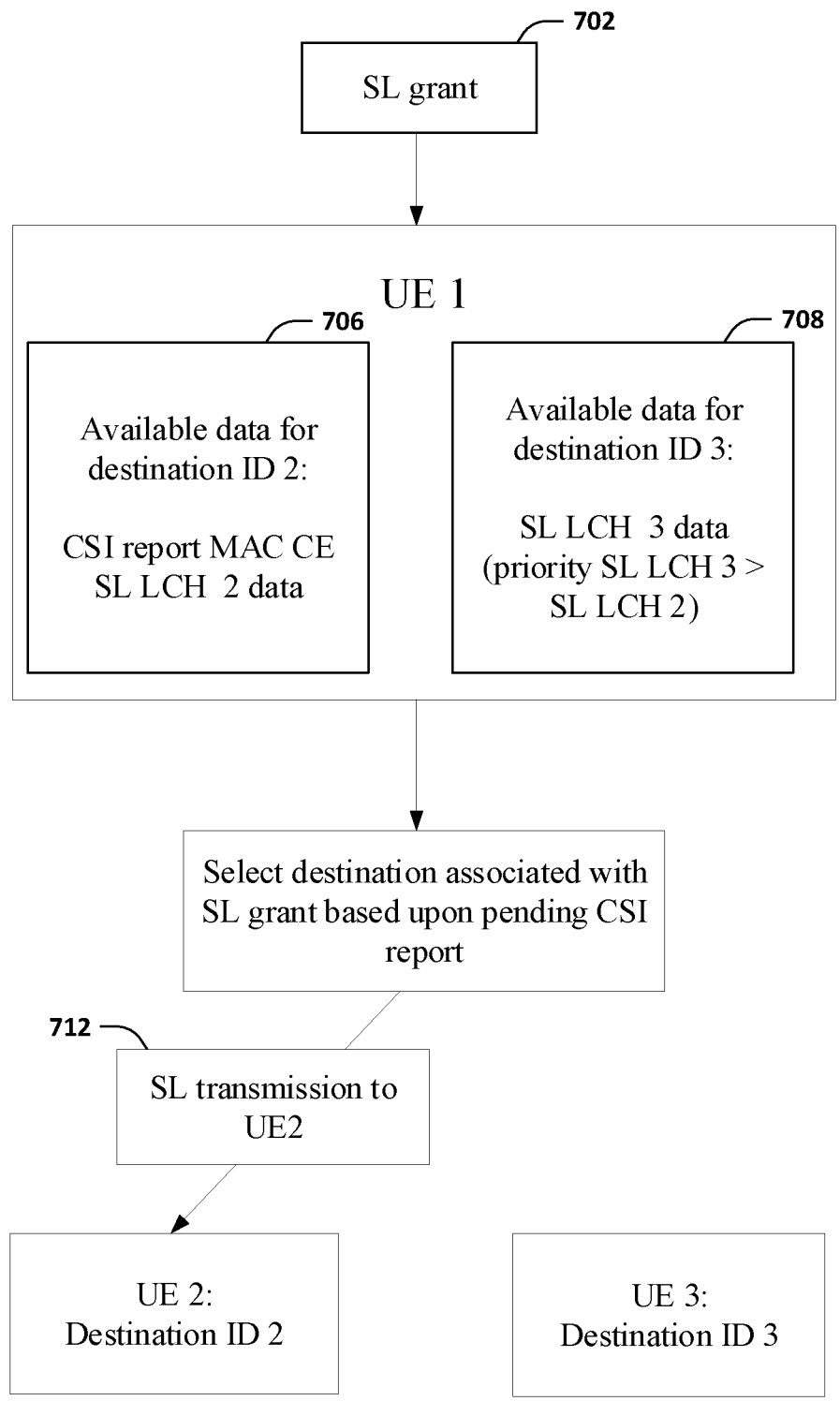
FIG. 7 is a diagram illustrating an exemplary scenario in which a first UE performs sidelink communication with a second UE and/or a third UE, according to one exemplary embodiment.

FIG. 7 illustrates an exemplary scenario in which a first UE "UE 1" performs sidelink communication with a second UE "UE 2" and/or a third UE "UE 3", in accordance with some embodiments. The sidelink communication may be unicast, groupcast and/or broadcast. The UE 2 and the UE 3 have different destination IDs (e.g., the UE 2 has a destination ID 2 and the UE 3 has a destination ID 3 that is different than the destination ID 2). Available data 706 that the UE 1 has for the UE 2 comprises a pending CSI report (e.g., a CSI report MAC CE) and sidelink data available for transmission associated with SL LCH 2 (e.g., a sidelink logical channel associated with the UE 2). Available data 708 that the UE 1 has for the UE 3 comprises sidelink data available for transmission associated with SL LCH 3 (e.g., a sidelink logical channel associated with the UE 3). For example, the available data 708 may not comprise a pending and/or triggered CSI report (e.g., a CSI report MAC CE). A priority of the SL LCH 3 associated with the UE 3 may be higher than a priority of the SL LCH 2 associated with the UE 2. The UE 1 may receive (and/or select) a sidelink grant 702 (SL grant) for sidelink transmission. The UE 1 may select the destination ID 2 (e.g., the UE 2) for transmission in accordance with the sidelink grant 702 based upon the pending CSI report associated with the destination ID 2. The UE 1 may not select the destination ID 3 for transmission in accordance with the sidelink grant 702 (even if the priority of the SL LCH 3 associated with the UE 3 is higher than the priority of the SL LCH 2 associated with the UE 2) based upon the available data 706 for the UE 2 comprising the pending CSI report and/or the destination ID 3 not being associated with a pending CSI report.

In some examples, report signalings (e.g., pending and/or triggered report signalings, such as at least one of triggered sidelink CSI reports, triggered sidelink RSRP reports, sidelink CSI report MAC CEs available for transmission, sidelink RSRP report MAC CEs available for transmission, etc.) may be associated with priorities (such as comparable to priorities, associated with sidelink logical channels of destinations, discussed herein). In some examples, the UE may select a destination (such as for sidelink transmission) from among one or more destinations based upon one or more first priorities associated with one or more report signalings (e.g., triggered report signalings, pending report signalings and/or report signalings that are available for transmission) and/or one or more second priorities associated with one or more sidelink logical channels with sidelink data available for transmission. For example, the UE may select the destination based upon the destination being associated with a report signaling (e.g., a triggered report signaling, a pending report signaling and/or a report signaling available for transmission) having a highest priority for transmission among the one or more first priorities. Alternatively and/or additionally, the UE may select the destination based upon the destination being associated with a report signaling having a highest priority among the one or more first priorities and the one or more second priorities. Alternatively and/or additionally, the UE may select the destination based upon the destination being associated with a sidelink logical channel, with sidelink data available for transmission, having a highest priority among the one or more second priorities. Alternatively and/or additionally, the UE may select the destination based upon the destination being associated with a sidelink logical channel, with sidelink data available for transmission, having a highest priority among the one or more first priorities and the one or more second priorities.

In some examples, a report signaling corresponding to a RSRP report may be associated with a priority that is higher than a priority associated with a report signaling corresponding to a CSI report. For example, a UE may select (such as for sidelink transmission) a first destination associated with a pending and/or triggered RSRP report (e.g., L3-filtered RSRP report) over a second destination associated with a pending and/or triggered CSI report for sidelink transmission. For example, the UE may select the first destination from among the first destination and the second destination by prioritizing RSRP reports over CSI reports.

In some examples, a report signaling corresponding to a CSI report may be associated with a priority that is higher than a priority associated with a report signaling corresponding to a RSRP report. For example, a UE may select (such as for sidelink transmission) a first destination associated with a pending and/or triggered CSI report over a second destination associated with a pending and/or triggered RSRP report (e.g., L3-filtered RSRP report) for sidelink transmission. For example, the UE may select the first destination from among the first destination and the second destination by prioritizing CSI reports over RSRP reports.

In some examples, a report signaling (e.g., a triggered report signaling, a pending report signaling and/or a report signaling available for transmission) associated with a destination selected for transmission may be associated with a highest priority of a sidelink logical channel that is configured (e.g., pre-configured), such as by a base station.

In some examples, a priority of a report signaling (e.g., a triggered report signaling, a pending report signaling and/or a report signaling available for transmission) associated with a destination may correspond to a highest priority of one or more priorities associated with one or more sidelink logical channels associated with the destination (e.g., the one or more sidelink logical channels may be configured, such as pre-configured, by a base station).

Alternatively and/or additionally, the report signaling may be prioritized over sidelink data associated with one or more sidelink logical channels when being multiplexed in a MAC Protocol Data Unit (PDU) (e.g., a sidelink MAC PDU).

Figures 8, 9:
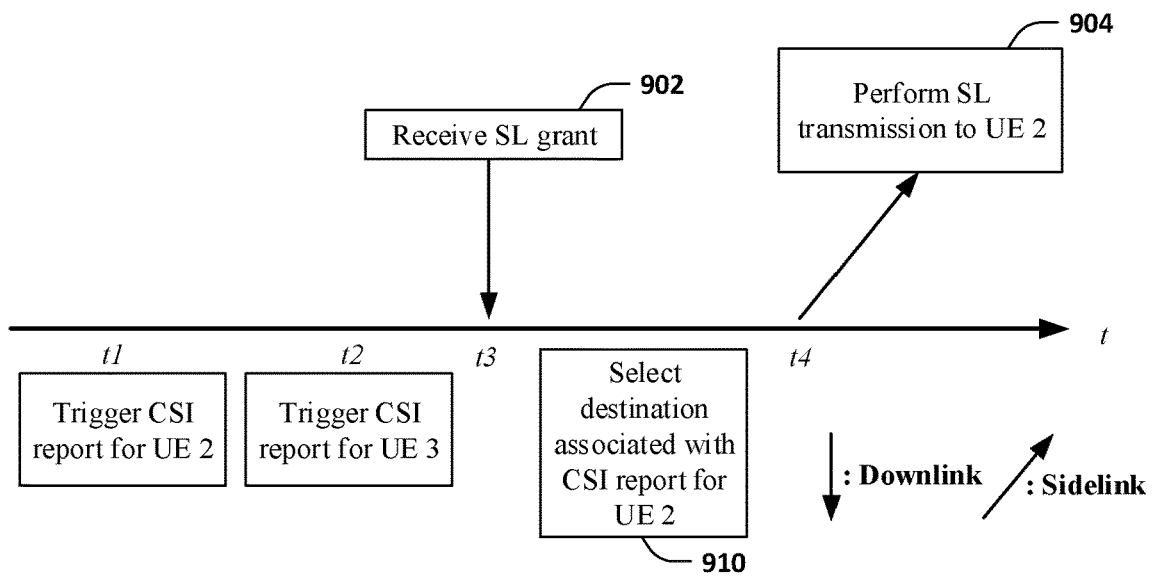
FIG. 8 illustrates a table illustrating various cases in which a UE selects a destination, according to one exemplary embodiment.
FIG. 9 is a diagram illustrating an exemplary scenario associated with a first UE, a second UE and/or a third UE, according to one exemplary embodiment.

FIG. 8 illustrates a table 800 showing various cases in which a UE 1 selects a destination (e.g., a UE) from among a UE 2 and a UE 3, according to some embodiments. A priority for logical channel data that is pending for the UE 3 may be higher than a priority for logical channel data that is pending for the UE 2 (in cases of the table 800 in which the UE 2 and the UE 3 have logical channel data pending).

In some examples, the UE 1 prioritizes selecting a destination associated with pending data (e.g., pending sidelink data) and a MAC CE (e.g., a sidelink CSI report MAC CE and/or a sidelink RSRP report MAC CE). For example, the UE 1 may prioritize selecting a destination (e.g., the UE 2 or the UE 3) for which the UE 1 has pending data (e.g., pending sidelink data) and a MAC CE (e.g., a triggered MAC CE, a pending MAC CE and/or a MAC CE available for transmission).

In case 1, the UE 1 has pending data (e.g., pending sidelink data) as well as a MAC CE (e.g., a sidelink CSI report MAC CE and/or a sidelink RSRP report MAC CE that is triggered, pending and/or available for transmission) for both the UE 2 and the UE 3. In case 1, the UE 1 may select the UE 3 for transmission (e.g., sidelink transmission) based upon the priority for the logical channel data that is pending for the UE 3 being higher than the priority for the logical channel data that is pending for the UE 2.

Alternatively and/or additionally, in case 1, the UE 1 may select the UE 2 for transmission based upon a priority of a pending MAC CE for the UE 2 being higher than a priority of a pending MAC CE for the UE 3.

Alternatively and/or additionally, in case 1, the UE 1 may select the UE 2 or the UE 3 based upon a trigger time associated with a MAC CE pending for the UE 2 and a trigger time associated with a MAC CE pending for the UE 3. The trigger time associated with the MAC CE pending for the UE 2 may correspond to a time at which the UE 2 triggers the UE 1 to perform CSI reporting and/or RSRP reporting. Alternatively and/or additionally, the trigger time associated with the MAC CE pending for the UE 2 may correspond to a time that the UE 1 receives a sidelink transmission, triggering CSI reporting and/or RSRP reporting, from the UE 2. In some examples, the UE 1 may select the UE 2 for transmission based upon the trigger time associated with the MAC CE pending for the UE 2 being earlier than the trigger time associated with the MAC CE pending for the UE 3. Alternatively and/or additionally, the UE 1 may prioritize the MAC CE pending for the UE 2 over the MAC CE pending for the UE 3 based upon the trigger time associated with the MAC CE pending for the UE 2 being earlier than the trigger time associated with the MAC CE pending for the UE 3.

Alternatively and/or additionally, in case 1, the UE 1 may select the UE 2 or the UE 3 based upon a type of MAC CE pending for the UE 2 and a type of MAC CE pending for the UE 3. In an example where the MAC CEs are different types, such as where one of the MAC CEs is a RSRP reporting MAC CE and one of the MAC CEs is a CSI-reporting MAC CE, the UE 1 may prioritize one of the MAC CEs over the other based upon type and select the destination (e.g., the UE 2 or the UE 3) corresponding to the prioritized MAC CE.

In some examples, MAC CEs comprising RSRP reporting information may be prioritized over MAC CEs comprising CSI-reporting information. For example, power adjustment via RSRP-reporting may be more important and/or more time-sensitive for sidelink communication than link adaptation via CSI-reporting. In an example, in case 1, the UE 1 may select the UE 3 for transmission based upon a pending MAC CE for the UE 3 comprising RSRP-reporting information and a pending MAC CE for the UE 2 comprising CSI-reporting information.

Alternatively and/or additionally, MAC CEs comprising CSI reporting information may be prioritized over MAC CEs comprising RSRP-reporting information. In an example, in case 1, the UE 1 may select the UE 2 for transmission based upon a pending MAC CE for the UE 3 comprising RSRP-reporting information and a pending MAC CE for the UE 2 comprising CSI-reporting information.

In some examples, in case 2 where the UE 1 has pending data (e.g., pending sidelink data) for both the UE 2 and the UE 3, the UE 1 may prioritize selecting a destination (e.g., the UE 2 or the UE 3) for which the UE 1 has a MAC CE (e.g., a triggered MAC CE, a pending MAC CE and/or a MAC CE available for transmission). In an example of case 2 where the UE 1 has a pending MAC CE and pending data (e.g., pending sidelink data) for the UE 2 and the UE 1 has pending data (e.g., pending sidelink data) for the UE 3, the UE 1 may select the UE 2 for transmission (e.g., sidelink transmission) based upon the UE 1 having a pending MAC CE for the UE 2 (e.g., the selection of the UE 2 for transmission may be performed regardless of and/or without considering whether a priority of the pending data for the UE 3 is higher than a priority of the pending MAC CE for the UE 2 and/or a priority of the pending data for the UE 2).

Alternatively and/or additionally, in an example of case 2 where the UE 1 has a pending MAC CE and pending data (e.g., pending sidelink data) for the UE 2 and the UE 1 has pending data (e.g., pending sidelink data) for the UE 3, the UE 1 may select the UE 2 or the UE 3 for transmission (e.g., sidelink transmission) based upon a priority of the pending MAC CE for the UE 2, a priority of the pending data for the UE 2 and/or a priority of the pending data for the UE 3. For example, the UE 1 may select the UE 2 for transmission (and/or the UE 1 may prioritize transmission of the pending MAC CE for the UE 2) based upon the priority of the pending MAC CE for the UE 2 and/or the priority of the pending data for the UE 2 being higher than the priority of the pending data for the UE 3. Alternatively and/or additionally, the UE 1 may select the UE 3 for transmission (and/or the UE 1 may prioritize transmission of the pending data for the UE 3) based upon the priority of the pending data for the UE 3 being higher than the priority of the pending MAC CE for the UE 2 and/or the priority of the pending data of the UE 2.

In some examples, in case 3 where the UE 1 has a pending MAC CE (e.g., a triggered MAC CE, a pending MAC CE and/or a MAC CE available for transmission) for both the UE 2 and the UE 3, the UE 1 may prioritize selecting a destination (e.g., the UE 2 or the UE 3) for which the UE 1 has pending data (e.g., pending sidelink data). In an example of case 3 where the UE 1 has a pending MAC CE and pending data (e.g., pending sidelink data) for the UE 2 and the UE 1 has pending a pending MAC CE for the UE 3, the UE 1 may select the UE 2 for transmission (e.g., sidelink transmission) based upon the UE 1 having pending data for the UE 2. For example, transmission (e.g., sidelink transmission) for a destination with both a pending MAC CE and pending data may be prioritized over transmission for a destination with merely a pending MAC CE without pending data.

In some examples, in case 4 where the UE 1 has a pending MAC CE (e.g., a triggered MAC CE, a pending MAC CE and/or a MAC CE available for transmission) for one UE of the UE 2 and the UE 3 and pending data for another UE of the UE 2 and the UE 3, the UE 1 may prioritize selecting a destination (e.g., the UE 2 or the UE 3) based upon a priority of the pending data and a priority of the pending MAC CE. In an example of case 4 where the UE 1 has a pending MAC CE for the UE 2 and the UE 1 has pending data (e.g., pending sidelink data) for the UE 3, the UE 1 may select the UE 2 for transmission (e.g., sidelink transmission) based upon a priority of the pending MAC CE for the UE 2 being higher than a priority of the pending data for the UE 3.

Alternatively and/or additionally, the UE 1 may prioritize (e.g., always prioritize) selecting a UE associated with a pending MAC CE over a UE that is not associated with a pending MAC CE. In an example of case 4 where the UE 1 has a pending MAC CE for the UE 2 and the UE 1 has pending data (e.g., pending sidelink data) for the UE 3, the UE 1 may select the UE 2 for transmission (e.g., sidelink transmission) regardless of whether a priority of the pending MAC CE for the UE 2 is higher than a priority of the pending data for the UE 3.

Alternatively and/or additionally, the UE 1 may prioritize (e.g., always prioritize) selecting a UE associated with pending data (e.g., pending sidelink data) over a UE that is not associated with pending data. In an example of case 4 where the UE 1 has a pending MAC CE for the UE 2 and the UE 1 has pending data (e.g., pending sidelink data) for the UE 3, the UE 1 may select the UE 3 for transmission (e.g., sidelink transmission) regardless of whether a priority of the pending data for the UE 3 is higher than a priority of the pending MAC CE for the UE 2.

Alternatively and/or additionally, the UE 1 may be configured (e.g., pre-configured) with a priority threshold for data (e.g., sidelink data). The UE 1 may prioritize selecting a UE (e.g., the UE 2 or the UE 3) for transmission (e.g., sidelink transmission) if the UE 1 has pending data for the UE and a priority of the pending data is higher than the priority threshold. Alternatively and/or additionally, the UE 1 may prioritize selecting a first UE (e.g., the UE 2 or the UE 3) for transmission (e.g., sidelink transmission) over a second UE (e.g., the UE 2 or the UE 3) if the UE 1 has pending data for the second UE, a priority of the pending data is less than the priority threshold, and the UE 1 has a pending MAC CE for the first UE. In an example of case 4 where the UE 1 has a pending MAC CE without pending data for the UE 2 and the UE 1 has pending data (e.g., pending sidelink data) without a pending MAC CE for the UE 3, the UE 1 may select the UE 3 for transmission (e.g., sidelink transmission) if a priority of the pending data for the UE 3 is higher than the priority threshold. In an example of case 4 where the UE 1 has a pending MAC CE without pending data for the UE 2 and the UE 1 has pending data (e.g., pending sidelink data) without a pending MAC CE for the UE 3, the UE 1 may select the UE 2 for transmission (e.g., sidelink transmission) if a priority of the pending data for the UE 3 is less than the priority threshold.

Alternatively and/or additionally, in an example of case 4 where the UE 1 is in NR sidelink mode-1 (e.g., NW scheduling mode), the UE 1 may select the UE 2 or the UE 3 based upon a resource size indicated by a sidelink grant. In some examples, if the resource size is smaller than a threshold resource size, the UE 1 may prioritize selecting a UE (e.g., the UE 2 or the UE 3) for which the UE 1 has a pending MAC CE and does not have pending data. Alternatively and/or additionally, if the resource size is larger than (or equal to) a threshold resource size, the UE 1 may prioritize selecting a UE (e.g., the UE 2 or the UE 3) for which the UE 1 has pending data and does not have a pending MAC CE.

In some examples, in case 5 where the UE 1 has a pending MAC CE (e.g., a triggered MAC CE, a pending MAC CE and/or a MAC CE available for transmission) for both the UE 2 and the UE 3 and the UE 1 does not have pending data (e.g., pending sidelink data) for either the UE 2 or the UE 3, the UE 1 may prioritize selecting a UE of the UE 2 and the UE 3 for transmission based upon a priority of a pending MAC CE for the UE 2 and a priority of a pending MAC CE for the UE 3.

In some examples, a priority for a pending MAC CE may be determined and/or derived based upon a trigger time of the pending MAC CE. In some examples, the trigger time associated with the pending MAC CE may correspond to a time at which the UE 1 is triggered to perform CSI reporting and/or RSRP reporting corresponding to the pending MAC CE. Alternatively and/or additionally, the trigger time associated with the pending MAC CE may correspond to a time that the UE 1 receives a sidelink transmission triggering CSI reporting and/or RSRP reporting corresponding to the pending MAC CE. In some examples, a pending MAC CE with an earlier trigger time may be prioritized over a pending MAC CE with a later trigger time. An intention for prioritizing a pending MAC CE with an earlier trigger time over a pending MAC CE with a later trigger time is to enable the UE 1 to transmit MAC CEs in accordance with an order in which the UE 1 is triggered to perform CSI reporting and/or RSRP reporting (e.g., the UE 1 may not be allowed to transmit (and/or may be prevented from transmitting) MAC CEs out of order). In an example where a trigger time of the pending MAC CE for the UE 2 is earlier than a trigger time of the pending MAC CE for the UE 3, the UE 1 may prioritize the pending MAC CE for the UE 2 over the pending MAC CE for the UE 3 (and/or the UE 1 may select the UE 2 for transmission).

Alternatively and/or additionally, a pending MAC CE with a later trigger time may be prioritized over a pending MAC CE with an earlier trigger time. An intention for prioritizing a pending MAC CE with a later trigger time over a pending MAC CE with an earlier trigger time is to enable the UE 1 to transmit a MAC CE while the MAC CE is still relevant and/or before the MAC CE is outdated. It may be appreciated that prioritizing a pending MAC CE with a later trigger time over a pending MAC CE with an earlier trigger time may provide benefits such as enabling the UE 1 to transmit a most recently triggered MAC CE and/or enabling the UE 1 to transmit a MAC CE that accurately reflects current conditions. In an example where a trigger time of the pending MAC CE for the UE 2 is earlier than a trigger time of the pending MAC CE for the UE 3, the UE 1 may prioritize the pending MAC CE for the UE 3 over the pending MAC CE for the UE 2 (e.g., the UE 1 may select the UE 3 for sidelink transmission).

Alternatively and/or additionally, in case 5, the UE 1 may select the UE 2 or the UE 3 based upon a type of MAC CE pending for the UE 2 and a type of MAC CE pending for the UE 3. In an example where the MAC CEs are different types, such as where one of the MAC CEs is a RSRP-reporting MAC CE and one of the MAC CEs is a CSI-reporting MAC CE, the UE 1 may prioritize one of the MAC CEs over the other based upon type and select the destination (e.g., the UE 2 or the UE 3) corresponding to the prioritized MAC CE.

In some examples, MAC CEs comprising RSRP-reporting information may be prioritized over MAC CEs comprising CSI-reporting information. For example, power adjustment via RSRP-reporting may be more important and/or more time-sensitive for sidelink communication than link adaption via CSI-reporting. In an example, in case 5, the UE 1 may select the UE 3 for transmission based upon a pending MAC CE for the UE 3 comprising RSRP-reporting information and a pending MAC CE for the UE 2 comprising CSI-reporting information.

Alternatively and/or additionally, MAC CEs comprising CSI reporting information may be prioritized over MAC CEs comprising RSRP-reporting information. In an example, in case 5, the UE 1 may select the UE 2 for transmission based upon a pending MAC CE for the UE 3 comprising RSRP-reporting information and a pending MAC CE for the UE 2 comprising CSI-reporting information.

In a second example concept of the present disclosure, in response to a sidelink grant and/or a SCI, a UE may select a destination among one or more destinations based upon triggering timing and/or pending timing of report signaling.

In an example, the UE may select a first destination of the one or more destinations over a second destination of the one or more destinations if the first destination is associated with a reporting signaling that is pending and/or triggered earlier than a report signaling (e.g., any report signaling) associated with the second destination is pending and/or triggered. In the example, a highest priority among one or more sidelink logical channels with data available for transmission for the first destination may be the same as a highest priority among one or more sidelink logical channels with data available for transmission for the second destination. In the example, a highest priority among one or more sidelink logical channels configured for the first destination may be the same as a highest priority among one or more sidelink logical channels configured for the second destination. In the example, a highest priority among one or more sidelink logical channels configured for the first destination may be the same as a highest priority among one or more sidelink logical channels configured for the second destination. In the example, one or more sidelink logical channels (e.g., one or more configured sidelink logical channels) with a highest priority for the first destination may or may not have data (e.g., sidelink data) available for transmission. In the example, one or more sidelink logical channels (e.g., one or more configured sidelink logical channels) with a highest priority for the second destination may or may not have data (e.g., sidelink data) available for transmission.

An embodiment of the second example concept is illustrated in FIG. 9. FIG. 9 illustrates an exemplary scenario associated with a first UE "UE 1", a second UE "UE 2" and/or a third UE "UE 3", in accordance with some embodiments. The UE 1 may be triggered to perform measurement reporting for the UE 2 and/or the UE 3. For example, a sidelink CSI report associated with the UE 2 may be triggered and/or pending in the UE 1 at timing t1. A sidelink CSI report associated with the UE 3 may be triggered and/or pending in the UE 1 at timing t2, after the timing t1. The UE 1 may receive (and/or may select) a sidelink grant 902 at timing t3, after the timing t2. The UE 1 may perform one or more operations 910 for selecting a destination for transmission (e.g., sidelink transmission) associated with the sidelink grant 902. The UE 1 may select a destination corresponding to the UE 2 over a destination corresponding to the UE 3 based upon the CSI report for the UE 2 being triggered and/or pending earlier than the CSI report for the UE 3. Accordingly, the UE 1 may perform a sidelink transmission 904 to the UE 2 based upon the selection of the destination corresponding to the UE 2. The sidelink transmission 904 may be in accordance with the sidelink grant 902.

In a third example concept of the present disclosure, a UE may select a destination among one or more destinations for sidelink transmission based upon one or more priorities of sidelink data associated with the one or more destinations, wherein at least one destination of the one or more destinations is associated with a pending and/or triggered report signaling. The sidelink transmission may be associated with a sidelink grant and/or a SCI. The UE may select the destination for sidelink transmission in response to the sidelink grant and/or the SCI.

For example, the UE may select a first destination of the one or more destinations over a second destination of the one or more destinations if the first destination is associated with sidelink data that is available for transmission (e.g., the UE has the sidelink data that is available for transmission to the first destination), the second destination is associated with a pending and/or triggered report signaling (e.g., the UE has a pending and/or triggered report signaling for transmission to the second destination), and a priority (e.g., a highest priority) associated with the sidelink data is higher than a threshold.

Alternatively and/or additionally, the UE may select the second destination of the one or more destinations over the first destination of the one or more destinations if the first destination is associated with sidelink data that is available for transmission (e.g., the UE has the sidelink data that is available for transmission to the first destination), the second destination is associated with a pending and/or triggered report signaling (e.g., the UE has a pending and/or triggered report signaling for transmission to the second destination), and the priority (e.g., a highest priority) associated with the sidelink data is lower than a threshold.

In a fourth example concept of the present disclosure, a UE may select a destination among one or more destinations for sidelink transmission based upon a size associated with a sidelink grant. The sidelink transmission may be associated with the sidelink grant and/or a SCI. In some examples, the sidelink grant is associated with the SCI. The UE may select the destination for sidelink transmission in response to the sidelink grant and/or the SCI. In some examples, the size is a size of the sidelink grant. Alternatively and/or additionally, the size is a resource size indicated by the sidelink grant. In some examples, each destination of the one or more destinations may be associated with a triggered and/or pending report signaling (e.g., for each destination of the one or more destinations, the UE has a pending and/or triggered report signaling for transmission to the destination). Alternatively and/or additionally, each destination of the one or more destinations may not be associated with a triggered and/or pending report signaling (e.g., the UE may not have a pending and/or triggered report signaling for transmission to any destination of the one or more destinations). In some examples, each destination of the one or more destinations may be associated with sidelink data that is available for transmission (e.g., for each destination of the one or more destinations, the UE has sidelink data that is available for transmission to the destination). Alternatively and/or additionally, each destination of the one or more destinations may not be associated with sidelink data that is available for transmission (e.g., the UE may not have sidelink data that is available for transmission to any destination of the one or more destinations).

In some examples, if the size associated with the sidelink grant is smaller than (or equal to) a value (e.g., the value may correspond to a threshold size that is configured and/or pre-configured by a base station), the UE may select a destination, for the sidelink transmission associated with the sidelink grant and/or the SCI, that is associated with a pending and/or triggered report signaling and not associated with sidelink data (e.g., any sidelink data) (e.g., the sidelink transmission may correspond to transmitting the pending and/or triggered report signaling to the destination).

Alternatively and/or additionally, if the size associated with the sidelink grant is larger than (or equal to) a value (e.g., the value may correspond to a threshold size that is configured and/or pre-configured by a base station), the UE may not select a destination, for the sidelink transmission associated with the sidelink grant and/or the SCI, that is associated with a pending and/or triggered report signaling and not associated with sidelink data (e.g., any sidelink data).

In an example, a UE may perform sidelink communication with a first destination and a second destination. The first destination may be associated with sidelink data available for transmission and may not be associated with a pending and/or triggered report signaling (e.g., the UE has the sidelink data that is available for transmission to the first destination and the UE may not have any pending and/or triggered report signaling for transmission to the first destination). The second destination may be associated with a pending and/or triggered report signaling and/or may not be associated with a sidelink data available for transmission (e.g., the UE has the pending and/or triggered report signaling for transmission to the second destination and the UE may not have any sidelink data available for transmission to the second destination). When the UE receives (and/or selects) a sidelink grant associated with a sidelink transmission, the UE may select the second destination for the sidelink transmission if a size associated with the sidelink grant is smaller than (or equal to) a threshold. The UE may not select the second destination for the sidelink transmission if the size is larger than (or equal to) a threshold. Alternatively and/or additionally, the UE may select the first destination for the sidelink transmission if the size is larger than (or equal to) a threshold. The UE may not select the first destination if the size is smaller than (or equal to) a threshold. In some examples, the size is a size of the sidelink grant. Alternatively and/or additionally, the size is a resource size indicated by the sidelink grant.

In one, some and/or all of the foregoing techniques and/or embodiments, such as those described with respect to the first example concept, the second example concept, the third example concept and/or the fourth example concept, and/or others provided herein, the first destination may be different than the second destination. Alternatively and/or additionally, the first destination may be a first destination identity (e.g., a first layer-2 destination identity). Alternatively and/or additionally, the second destination may be a second destination identity (e.g., a second layer-2 destination identity). Alternatively and/or additionally, the first destination identity may be different than the second destination identity. Alternatively and/or additionally, the first destination may be a first ProSe destination. Alternatively and/or additionally, the second destination may be a second ProSe destination.

Sidelink data, discussed herein with respect to one, some and/or all of the foregoing techniques and/or embodiments, may be associated with a sidelink logical channel.

The UE, discussed herein with respect to one, some and/or all of the foregoing techniques and/or embodiments, may perform unicast communication with a first UE associated with the first destination and/or a second UE associated with the second destination. Alternatively and/or additionally, the UE may perform groupcast communication with the first UE associated with the first destination and/or the second UE associated with the second destination. Alternatively and/or additionally, the UE may perform broadcast communication with the first UE associated with the first destination and/or the second UE associated with the second destination.

The one or more destinations, discussed herein with respect to one, some and/or all of the foregoing techniques and/or embodiments, may be associated with one or more UEs. Alternatively and/or additionally, a destination of the one or more destinations may be associated with one or more UEs.

A threshold, discussed herein with respect to one, some and/or all of the foregoing techniques and/or embodiments, may be configured by a base station. Alternatively and/or additionally, the threshold may be pre-configured.

One, some and/or all of the foregoing techniques and/or embodiments can be formed to a new embodiment.

In some examples, embodiments and/or techniques described herein, such as embodiments and/or techniques described with respect to the first example concept, the second example concept, the third example concept and the fourth example concept, may be implemented independently and/or separately. Alternatively and/or additionally, a combination of embodiments and/or techniques described herein, such as embodiments and/or techniques described with respect to the first example concept, the second example concept, the third example concept and/or the fourth example concept and/or others provided herein, may be implemented. Alternatively and/or additionally, a combination of embodiments and/or techniques described herein, such as embodiments and/or techniques described with respect to the first example concept, the second example concept, the third example concept and/or the fourth example concept and/or others provided herein, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 10:
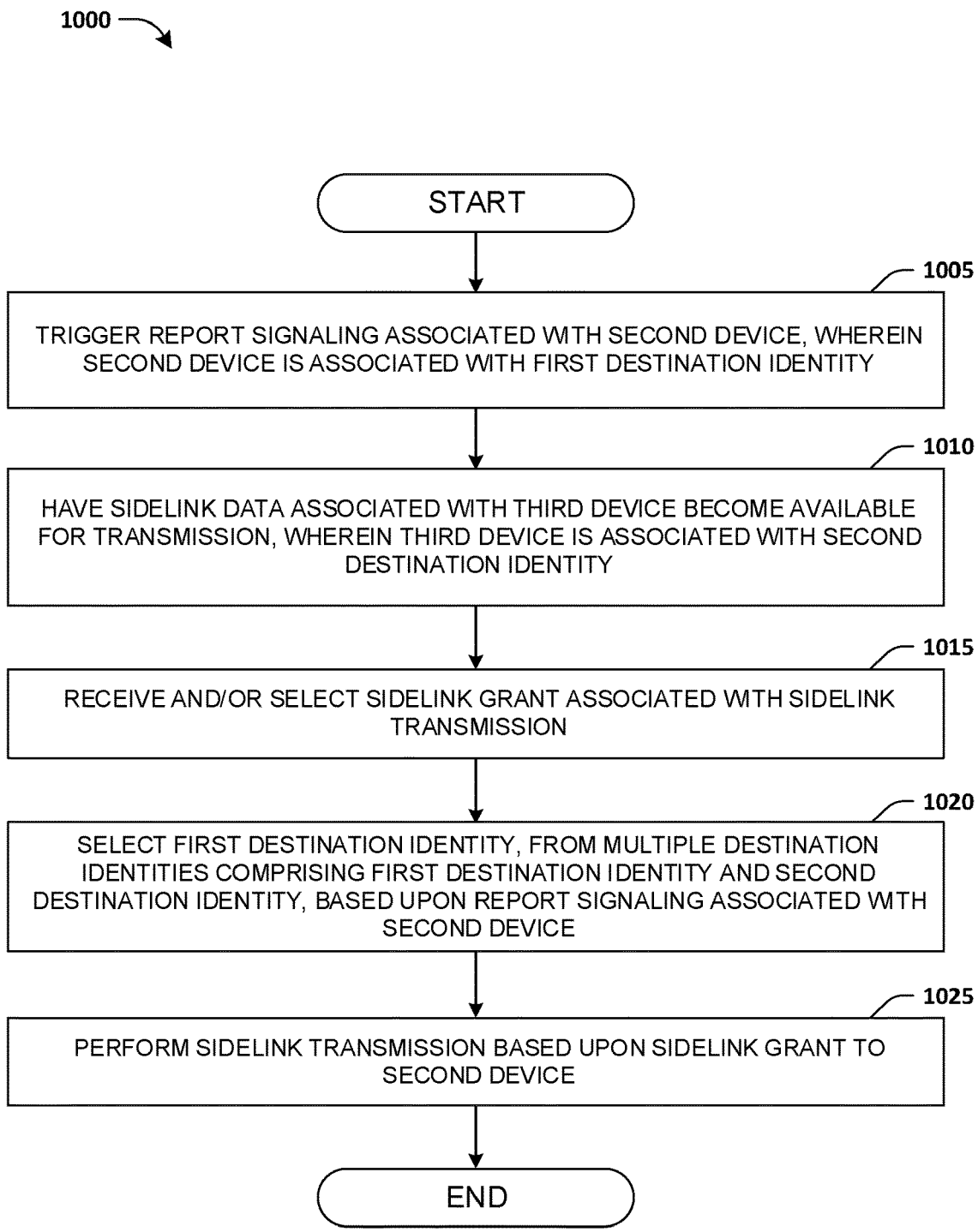
FIG. 10 is a flow chart according to one exemplary embodiment.

FIG. 10 is a flow chart 1000 according to one exemplary embodiment from the perspective of a first device. In step 1005, the first device triggers a report signaling associated with a second device, wherein the second device is associated with a first destination identity. In step 1010, the first device has sidelink data associated with a third device become available for transmission, wherein the third device is associated with a second destination identity. In step 1015, the first device receives and/or selects a sidelink grant associated with a sidelink transmission. In step 1020, the first device selects the first destination identity, from multiple destination identities comprising the first destination identity and the second destination identity, based upon the report signaling associated with the second device. In step 1025, the first device performs the sidelink transmission based upon the sidelink grant to the second device.

In one embodiment, the sidelink data is associated with one or more sidelink logical channels associated with the third device.

In one embodiment, the first device has second sidelink data available for the second device, wherein the second sidelink data is associated with one or more second sidelink logical channels associated with the second device.

In one embodiment, the first device does not have sidelink data available for the second device.

In one embodiment, the one or more second sidelink logical channels associated with the second sidelink data have one or more priorities that are lower than (or equal to) the one or more sidelink logical channels associated with the sidelink data.

In one embodiment, the report signaling is pending in the first device after being triggered.

In one embodiment, the first device generates a MAC control element for the report signaling in response to the sidelink grant (e.g., the first device may generate the MAC control element for the report signaling based upon the first destination identity being selected for the sidelink transmission). The MAC control element may comprise information corresponding to the report signaling.

In one embodiment, the first device generates a RRC signaling for the report signaling in response to the sidelink grant (e.g., the first device may generate the RRC signaling element for the report signaling based upon the first destination identity being selected for the sidelink transmission). The RRC signaling may comprise information corresponding to the report signaling.

In one embodiment, the first device transmits a Transport Block (TB) via the sidelink transmission, wherein the TB comprises the MAC control element (or the RRC signaling) associated with the report signaling.

In one embodiment, the report signaling is cancelled (e.g., the report signaling is no longer pending) in response to transmission of the TB comprising the MAC control element (or the RRC signaling) associated with the report signaling.

In one embodiment, the first device does not have a triggered and/or pending report signaling associated with the third device when the first device receives and/or selects the sidelink grant.

In one embodiment, the report signaling is triggered in response to receiving a triggering signal from the second device.

In one embodiment, the report signaling is based upon a timer and/or a counter (such as a timer and/or a counter configured by a base station). For example, report signalings associated with the second device may be triggered periodically, such as based upon a time interval between times that report signalings associated with the second device are to be triggered (e.g., the time interval may be configured by a base station).

In one embodiment, the report signaling is associated with CSI reporting.

In one embodiment, the report signaling is associated with RSRP reporting (e.g., Layer-3 filtered RSRP reporting).

In one embodiment, the report signaling is comprised in and/or is transmitted via a MAC CE.

In one embodiment, the report signaling is associated with a priority associated with a sidelink logical channel (e.g., the priority of the report signaling may be associated with and/or may be the same as a priority of the sidelink logical channel and/or the sidelink logical channel may be associated with sidelink data associated with the second device that is available for transmission).

In one embodiment, the report signaling is associated with a priority configured by a base station (e.g., the priority of the report signaling may be configured by the base station).

In one embodiment, the report signaling is associated with a priority higher than (or equal to) the highest priority of one or more priorities of one or more sidelink logical channels associated with the sidelink data associated with the third device and/or other sidelink data associated with one or more other devices with which the first device performs sidelink communication. In one embodiment, the first destination identity is selected (e.g., for the sidelink transmission) based upon the report signaling being associated with the priority higher than (or equal to) the highest priority of the one or more priorities.

Referring back to FIGS. 3 and 4, in one exemplary embodiment of a first device, the device 300 includes a program code 312 stored in the memory 310. The CPU 308 could execute program code 312 to enable the first device (i) to trigger a report signaling associated with a second device, wherein the second device is associated with a first destination identity, (ii) to have sidelink data associated with a third device become available for transmission, wherein the third device is associated with a second destination identity, (iii) to receive and/or select a sidelink grant associated with a sidelink transmission, (iv) to select the first destination identity, from multiple destination identities comprising the first destination identity and the second destination identity, based upon the report signaling associated with the second device, and (v) to perform the sidelink transmission based upon the sidelink grant to the second device. Furthermore, the CPU 308 can execute the program code 312 to perform one, some and/or all of the above-described actions and steps and/or others described herein.

Figure 11:
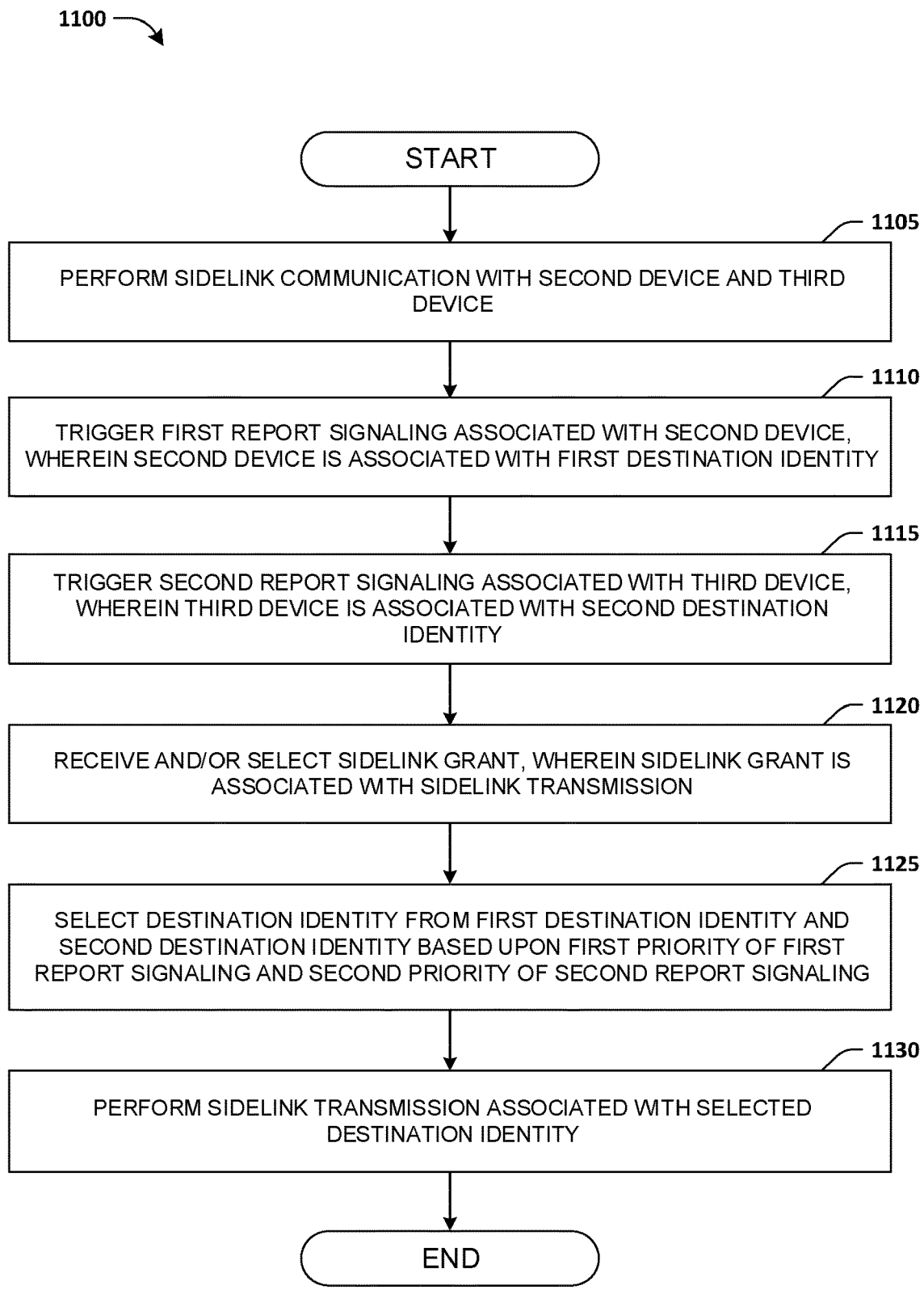
FIG. 11 is a flow chart according to one exemplary embodiment.

FIG. 11 is a flow chart 1100 according to one exemplary embodiment from the perspective of a first device. In step 1105, the first device performs sidelink communication with a second device and a third device. In step 1110, the first device triggers a first report signaling associated with the second device, wherein the second device is associated with a first destination identity. In step 1115, the first device triggers a second report signaling associated with the third device, wherein the third device is associated with a second destination identity. In step 1120, the first device receives and/or selects a sidelink grant, wherein the sidelink grant is associated with a sidelink transmission. In step 1125, the first device selects a destination identity from the first destination identity and the second destination identity based upon a first priority of the first report signaling and a second priority of the second report signaling (and/or based upon other information). In step 1130, the first device performs a sidelink transmission associated with the selected destination identity (i.e., the destination identity selected in step 1125).

In one embodiment, the first priority of the first report signaling is higher than the second priority of the second report signaling if the first report signaling is triggered earlier (in the time domain) than the second report signaling.

In one embodiment, the first device selects, for the sidelink transmission, a destination identity associated with a report signaling with a highest priority among multiple priorities associated with multiple report signalings and/or multiple destination identities.

In one embodiment, the first device has sidelink data available for transmission to the second device.

In one embodiment, the first device has sidelink data available for transmission to the third device.

In one embodiment, if multiple destination identities are associated with report signaling with a highest priority among multiple priorities associated with multiple report signalings (e.g., multiple destination identities may be associated with report signaling with a highest priority if each of the multiple destination identities are associated with a report signaling with the same priority and the same priority is highest among the multiple priorities associated with the multiple report signalings), the first device selects a destination identity that has sidelink data available for transmission with a highest priority among one or more priorities associated with one or more sets of sidelink data, associated with one or more destination identities, that are available for transmission.

In one embodiment, the first report signaling is triggered in response to receiving a triggering signaling from the second device.

In one embodiment, the first report signaling is based upon a timer and/or a counter (such as a timer and/or a counter configured by a base station). For example, report signalings associated with the second device may be triggered periodically, such as based upon a time interval between times that report signalings associated with the second device are to be triggered (e.g., the time interval may be configured by a base station).

In one embodiment, the second report signaling is triggered in response to receiving a triggering signaling from the third device.

In one embodiment, the second report signaling is based upon a timer and/or a counter (such as a timer and/or a counter configured by a base station). For example, report signalings associated with the third device may be triggered periodically, such as based upon a time interval between times that report signalings associated with the third device are to be triggered (e.g., the time interval may be configured by a base station).

In one embodiment, the first device generates a MAC control element for a triggered and/or pending report signaling associated with the selected destination identity in response to the sidelink grant (e.g., the first device may generate the MAC control element for the triggered and/or pending report signaling based upon the selected destination identity being selected for the sidelink transmission). In an example where the selected destination identity is the first destination identity, the triggered and/or pending report signaling may be the first report signaling. In an example where the selected destination identity is the second destination identity, the triggered and/or pending report signaling may be the second report signaling. The MAC control element may comprise information corresponding to the triggered and/or pending report signaling.

In one embodiment, the first device generates a RRC signaling for a triggered and/or pending report signaling associated with the selected destination identity in response to the sidelink grant (e.g., the first device may generate the RRC signaling for the triggered and/or pending report signaling based upon the selected destination identity being selected for the sidelink transmission). In an example where the selected destination identity is the first destination identity, the triggered and/or pending report signaling may be the first report signaling. In an example where the selected destination identity is the second destination identity, the triggered and/or pending report signaling may be the second report signaling. The RRC signaling may comprise information corresponding to the triggered and/or pending report signaling.

In one embodiment, the first device transmits a TB via the sidelink transmission, wherein the TB comprises the MAC control element (or the RRC signaling) associated with the triggered and/or pending report signaling. In an example where the selected destination identity is the first destination identity, the TB may be transmitted to the second device. In an example where the selected destination identity is the second destination identity, the TB may be transmitted to the third device.

In one embodiment, the first report signaling and/or the second report signaling are associated with CSI reporting.

In one embodiment, the first report signaling and/or the second report signaling are associated with RSRP reporting (e.g., Layer-3 filtered RSRP reporting).

In one embodiment, a report signaling (e.g., the first report signaling or the second report signaling) is comprised in and/or is transmitted via a MAC CE (e.g., the sidelink transmission may comprise transmission of the MAC CE comprising the report signaling). In an example where the selected destination identity is the first destination identity, the report signaling may be the first report signaling. In an example where the selected destination identity is the second destination identity, the report signaling may be the second report signaling.

In one embodiment, a report signaling (e.g., the first report signaling or the second report signaling) is associated with a priority associated with a sidelink logical channel (e.g., the first priority of the first report signaling may be associated with and/or may be the same as a priority of a sidelink logical channel and/or the sidelink logical channel may be associated with sidelink data associated with the second device that is available for transmission).

In one embodiment, a report signaling (e.g., the first report signaling or the second report signaling) is associated with a priority configured by a base station (e.g., the first priority of the first report signaling may be configured by the base station).

In one embodiment, a report signaling (e.g., the first report signaling or the second report signaling) is associated with a priority higher than (or equal to) the highest priority of one or more priorities of one or more sidelink logical channels associated with sidelink data (e.g., sidelink data available for transmission) associated with one or more devices with which the first device performs sidelink communication, such as the second device, the third device and/or one or more other devices. In one embodiment, a destination identity (e.g., the first destination identity or the second destination identity) is selected (e.g., for the sidelink transmission) based upon the report signaling being associated with the priority higher than (or equal to) the highest priority of the one or more priorities.

Referring back to FIGS. 3 and 4, in one exemplary embodiment of a first device, the device 300 includes a program code 312 stored in the memory 310. The CPU 308 could execute program code 312 to enable the first device (i) to perform sidelink communication with a second device and a third device, (ii) to trigger a first report signaling associated with the second device, wherein the second device is associated with a first destination identity, (iii) to trigger a second report signaling associated with the third device, wherein the third device is associated with a second destination identity, (iv) to receive and/or select a sidelink grant, wherein the sidelink grant is associated with a sidelink transmission, (v) to select a destination identity from the first destination identity and the second destination identity based upon a first priority of the first report signaling and a second priority of the second report signaling (and/or based upon other information), and (vi) to perform a sidelink transmission associated with the selected destination identity. Furthermore, the CPU 308 can execute the program code 312 to perform one, some and/or all of the above-described actions and steps and/or others described herein.

With respect to FIGS. 10-11, in one embodiment, the first destination identity is different than the second destination identity.

In one embodiment, the sidelink grant is selected via autonomous resource selection mode.

In one embodiment, the sidelink grant is received via network scheduling mode.

In one embodiment, the first device, the second device and/or the third device are V2X UEs.

Figure 12:
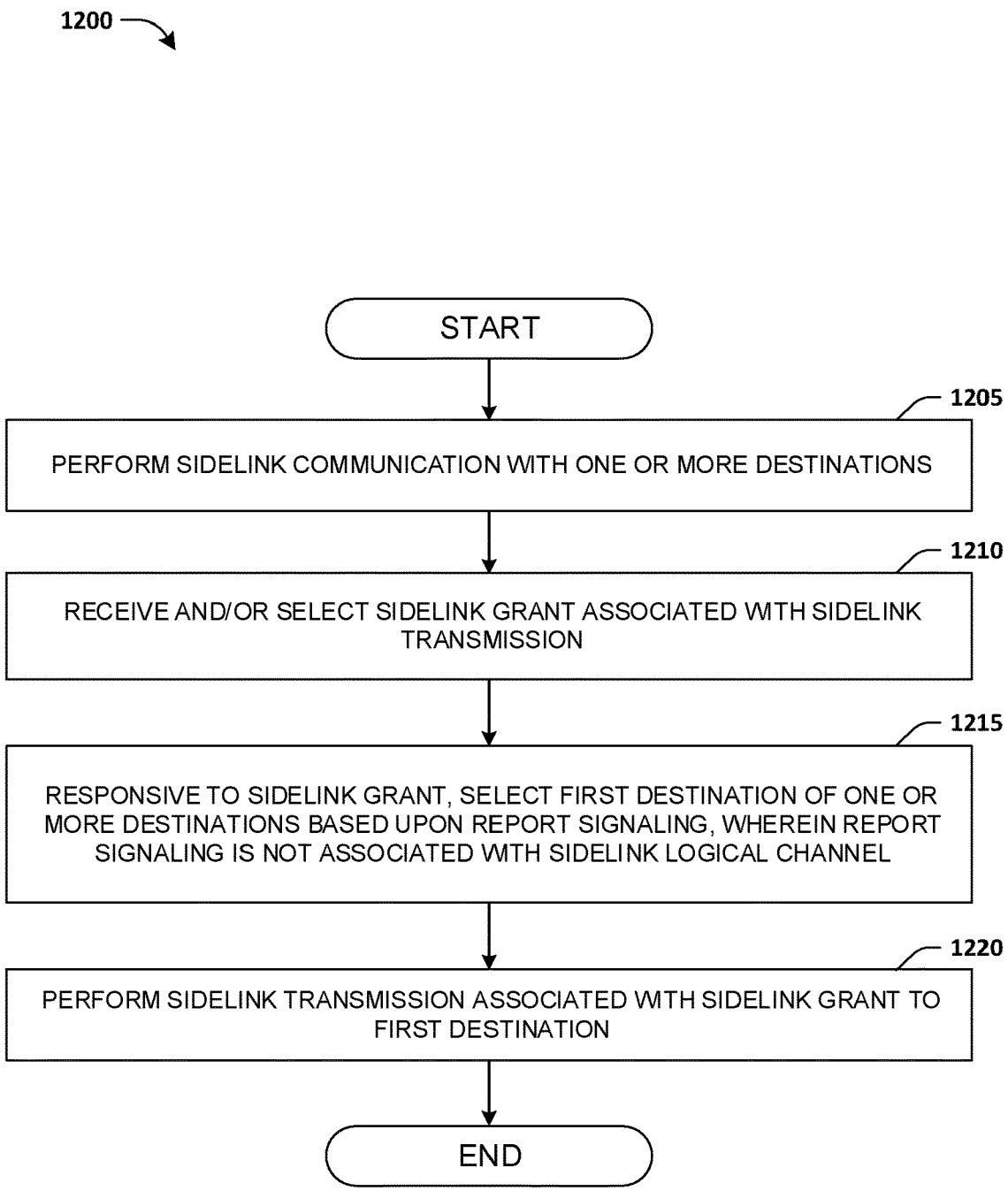
FIG. 12 is a flow chart according to one exemplary embodiment.

FIG. 12 is a flow chart 1200 according to one exemplary embodiment from the perspective of a first device. In step 1205, the first device performs sidelink communication with one or more destinations. In step 1210, the first device receives and/or selects a sidelink grant associated with a sidelink transmission. In step 1215, in response to the sidelink grant, the first device selects a first destination of the one or more destinations based upon a report signaling, wherein the report signaling is not associated with a sidelink logical channel. In step 1220, the first device performs the sidelink transmission associated with the sidelink grant to the first destination.

In one embodiment, selecting the first destination of the one or more destinations is performed based upon whether the report signaling is present (or absent).

In one embodiment, selecting the first destination of the one or more destinations is performed based upon a priority of the report signaling.

In one embodiment, the first destination is associated with the report signaling. Selecting the first destination of the one or more destinations is performed based upon the first destination being associated with the report signaling. In an example, the first device may not select a destination that is not associated with a report signaling.

In one embodiment, a priority of the report signaling is associated with a priority higher than or equal to a highest priority of one or more priorities of one or more sidelink logical channels associated with one, some and/or all destinations of the one or more destinations. In an example where the first destination is associated with the report signaling, the first device may select the first destination of the one or more destinations based upon the priority of the report signaling being associated with the priority that is higher than or equal to the highest priority.

In one embodiment, the reporting signaling is transmitted via a MAC CE.

In one embodiment, performing the sidelink transmission comprises transmitting the report signaling via a MAC CE (such as in an example where the report signaling is associated with the first destination), wherein the report signaling is associated with CSI reporting.

Referring back to FIGS. 3 and 4, in one exemplary embodiment of a first device, the device 300 includes a program code 312 stored in the memory 310. The CPU 308 could execute program code 312 to enable the first device (i) to perform sidelink communication with one or more destinations, (ii) to receive and/or select a sidelink grant associated with a sidelink transmission, (iii) responsive to the sidelink grant, to select a first destination of the one or more destinations based upon a report signaling, wherein the report signaling is not associated with a sidelink logical channel, and (iv) to perform the sidelink transmission associated with the sidelink grant to the first destination. Furthermore, the CPU 308 can execute the program code 312 to perform one, some and/or all of the above-described actions and steps and/or others described herein.

Figure 13:
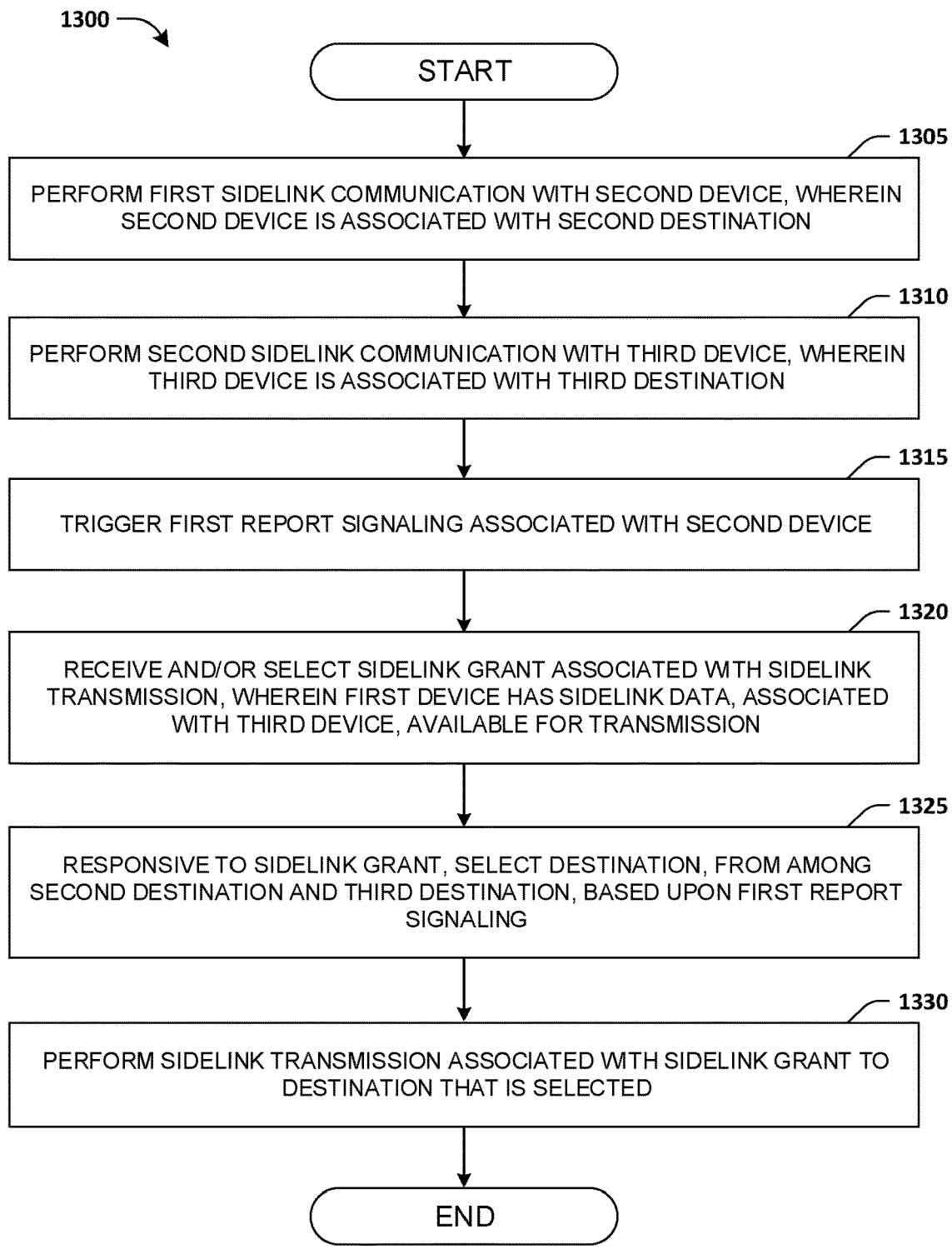
FIG. 13 is a flow chart according to one exemplary embodiment.

FIG. 13 is a flow chart 1300 according to one exemplary embodiment from the perspective of a first device. In step 1305, the first device performs first sidelink communication with a second device, wherein the second device is associated with a second destination. In step 1310, the first device performs second sidelink communication with a third device, wherein the third device is associated with a third destination. In step 1315, the first device triggers a first report signaling associated with the second device. In step 1320, the first device receives and/or selects a sidelink grant associated with a sidelink transmission, wherein the first device has sidelink data, associated with the third device, available for transmission (e.g., the first device may have the sidelink data associated with the third device become available for transmission). In step 1325, in response to the sidelink grant, the first device selects a destination, from among the second destination and the third destination, based upon the first report signaling. In step 1330, the first device performs the sidelink transmission associated with the sidelink grant to the destination that is selected.

In one embodiment, the first device is associated with a first destination.

In one embodiment, selecting the destination comprises selecting the second destination based upon the second destination being associated with the first report signaling and the third destination not being associated with a report signaling (e.g., not being associated with a report signaling that is triggered and/or pending in the first device).

In one embodiment, selecting the destination comprises selecting the second destination based upon presence of the first report signaling associated with the second destination and absence of a report signaling (e.g., absence of a report signaling that is triggered and/or pending in the first device) associated with the third destination.

In one embodiment, the first device selects the destination based upon a priority of the first report signaling.

In one embodiment, selecting the destination comprises selecting the second destination based upon a first priority of the first report signaling being higher than (or equal to) a second priority of the sidelink data associated with the third device. In an example, the first device selects the second destination if the first priority of the first report signaling is higher than (or equal to) the second priority of the sidelink data associated with the third device.

In one embodiment, selecting the destination comprises selecting the third destination based upon a first priority of the first report signaling being lower than (or equal to) a second priority of the sidelink data associated with the third device. In an example, the first device selects the third destination if the first priority of the first report signaling is lower than (or equal to) the second priority of the sidelink data associated with the third device.

In one embodiment, the first device has second sidelink data, associated with the second device, available for transmission (e.g., the first device may have the second sidelink data associated with the second device become available for transmission).

In one embodiment, selecting the destination comprises selecting the second destination based upon a highest priority, among a first priority of the second sidelink data associated with the second device and a second priority of the first report signaling, being higher than (or equal to) a third priority of the sidelink data associated with the third device. For example, the first device may select the second destination if the first priority is higher than (or equal to) the third priority of the sidelink data associated with the third device. Alternatively and/or additionally, the first device may select the second destination if the second priority is higher than (or equal to) the third priority of the sidelink data associated with the third device.

In one embodiment, the first priority (of the second sidelink data associated with the second device) is a highest priority among one or more first priorities of one or more first logical channels associated with the second sidelink data associated with the second device.

In one embodiment, the third priority (of the sidelink data associated with the third device) is a highest priority among one or more second priorities of one or more second logical channels associated with the sidelink data associated with the third device.

In one embodiment, the first priority (of the second sidelink data associated with the second device) is lower than or equal to the second priority of the first report signaling.

In one embodiment, the first priority (of the second sidelink data associated with the second device) is lower than the third priority of the sidelink data associated with the third device. In an example, selecting the destination comprises selecting the second destination based upon the second priority of the first report signaling being higher than the third priority of the sidelink data associated with the third device.

In one embodiment, selecting the destination comprises selecting the third destination based upon a highest priority, among the first priority (of the second sidelink data associated with the second device) and the second priority of the first report signaling, being lower than (or equal to) the third priority of the sidelink data associated with the third device. For example, the first device may select the third destination if the first priority and the second priority are lower than (and/or equal to) the third priority of the sidelink data associated with the third device.

In one embodiment, the first report signaling is a MAC CE.

In one embodiment, the first report signaling is associated with CSI reporting.

In one embodiment, the first sidelink communication is unicast, groupcast and/or broadcast.

In one embodiment, the second sidelink communication is unicast, groupcast and/or broadcast.

In one embodiment, performing the sidelink transmission comprises transmitting the first report signaling and the second sidelink data associated with the second device (such as in an example where the second destination associated with the second device is selected). For example, the sidelink transmission may comprise the first report signaling and the second sidelink data associated with the second device.

Referring back to FIGS. 3 and 4, in one exemplary embodiment of a first device, the device 300 includes a program code 312 stored in the memory 310. The CPU 308 could execute program code 312 to enable the first device (i) to perform first sidelink communication with a second device, wherein the second device is associated with a second destination, (ii) to perform second sidelink communication with a third device, wherein the third device is associated with a third destination, (iii) to trigger a first report signaling associated with the second device, (iv) to receive and/or select a sidelink grant associated with a sidelink transmission, wherein the first device has sidelink data, associated with the third device, available for transmission, (v) responsive to the sidelink grant, to select a destination, from among the second destination and the third destination, based upon the first report signaling, and (vi) to perform the sidelink transmission associated with the sidelink grant to the destination that is selected. Furthermore, the CPU 308 can execute the program code 312 to perform one, some and/or all of the above-described actions and steps and/or others described herein.

A device (e.g., a computing device, a communication device, a UE, a base station, a network node, etc.) may be provided, wherein the device may comprise a control circuit, a processor installed in the control circuit and/or a memory installed in the control circuit and coupled to the processor. The processor may be configured to execute a program code stored in the memory to perform one, some and/or all method steps illustrated in FIGS. 10-13. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 10-13, and/or one, some and/or all of the above-described actions and steps and/or others described herein.

It may be appreciated that applying one or more of the techniques presented herein may result in one or more benefits including, but not limited to, increased efficiency of communication between devices (e.g., UEs, sidelink devices, V2X devices, etc.). The increased efficiency may be a result of enabling a first device (e.g., a UE) to select a destination for sidelink transmission of a sidelink report signaling (comprising measurement information, for example) and/or to more quickly transmit the sidelink report signaling to the destination, such that the sidelink report signaling is received by the destination with less delay and such that information (e.g., measurement information) of the sidelink report signaling is relevant and/or accurately reflects current conditions when the sidelink report signaling is received by the destination. Thus, a device associated with the destination may perform one or more operations (e.g., adjust one or more parameters, such as at least one of one or more transmission parameters, one or more power parameters, etc.) more accurately in accordance with the sidelink report signaling.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first device for performing sidelink transmission, the method comprising:
performing sidelink communication with one or more destinations;
at least one of receiving or selecting a sidelink grant associated with a sidelink transmission;
responsive to the sidelink grant, selecting a first destination of the one or more destinations based upon a priority of a report signaling, wherein the report signaling is associated with Channel State Information (CSI) reporting, wherein the report signaling is not associated with a sidelink logical channel; and
performing the sidelink transmission associated with the sidelink grant to the first destination.

2. The method of claim 1, wherein:
the sidelink communication is unicast.

3. The method of claim 1, wherein:
the sidelink communication is at least one of groupcast or broadcast.

4. The method of claim 1, wherein:
the first destination is associated with the report signaling; and
the selecting the first destination of the one or more destinations is performed based upon the first destination being associated with the report signaling.

5. The method of claim 1, wherein:
the priority of the report signaling is associated with a priority higher than or equal to a highest priority of one or more priorities of one or more sidelink logical channels associated with at least one destination of the one or more destinations.

6. The method of claim 1, wherein:
the performing the sidelink transmission comprises transmitting the report signaling via a Medium Access Control (MAC) Control Element (CE).

7. A method of a first device for performing sidelink transmission, the method comprising:
performing first sidelink communication with a second device, wherein the second device is associated with a second destination;
performing second sidelink communication with a third device, wherein the third device is associated with a third destination;
triggering a first report signaling associated with the second device, wherein the first report signaling is associated with Channel State Information (CSI) reporting;
at least one of receiving or selecting a sidelink grant associated with a sidelink transmission, wherein the first device has sidelink data, associated with the third device, available for transmission;
responsive to the sidelink grant, selecting a destination, from among the second destination and the third destination, based upon a priority of the first report signaling; and
performing the sidelink transmission associated with the sidelink grant to the destination that is selected.

8. The method of claim 7, wherein:
the first device is associated with a first destination.

9. The method of claim 7, wherein:
the first report signaling is a Medium Access Control (MAC) Control Element (CE).

10. The method of claim 7, wherein:
the first sidelink communication is at least one of unicast, groupcast or broadcast.

11. The method of claim 7, wherein:
the selecting the destination comprises selecting the second destination based upon a first priority of the first report signaling being higher than a second priority of the sidelink data associated with the third device.

12. The method of claim 7, wherein:
the selecting the destination comprises selecting the third destination based upon a first priority of the first report signaling being lower than a second priority of the sidelink data associated with the third device.

13. The method of claim 7, wherein:
the first device has second sidelink data, associated with the second device, available for transmission.

14. The method of claim 13, wherein:
the selecting the destination comprises selecting the second destination based upon a highest priority, among a first priority of the second sidelink data associated with the second device and a second priority of the first report signaling, being higher than a third priority of the sidelink data associated with the third device.

15. The method of claim 14, wherein at least one of:
the first priority, of the second sidelink data associated with the second device, is a highest priority among one or more first priorities of one or more first logical channels associated with the second sidelink data associated with the second device; or
the third priority, of the sidelink data associated with the third device, is a highest priority among one or more second priorities of one or more second logical channels associated with the sidelink data associated with the third device.

16. The method of claim 14, wherein at least one of:
the first priority, of the second sidelink data associated with the second device, is lower than or equal to the second priority of the first report signaling; or
the first priority, of the second sidelink data associated with the second device, is lower than the third priority of the sidelink data associated with the third device.

17. The method of claim 7, wherein:
the second sidelink communication is unicast.

18. The method of claim 7, wherein:
the second sidelink communication is at least one of groupcast or broadcast.

19. The method of claim 13, wherein:
the performing the sidelink transmission comprises transmitting the first report signaling and the second sidelink data associated with the second device.

20. A first device, comprising:
a control circuit;
a processor installed in the control circuit; and
a memory installed in the control circuit and operatively coupled to the processor, wherein the processor is configured to execute a program code stored in the memory to perform operations, the operations comprising:
performing sidelink communication with one or more destinations;
at least one of receiving or selecting a sidelink grant associated with a sidelink transmission;
responsive to the sidelink grant, selecting a first destination of the one or more destinations based upon a priority of a report signaling, wherein the report signaling is associated with Channel State Information (CSI) reporting, wherein the report signaling is not associated with a sidelink logical channel; and
performing the sidelink transmission associated with the sidelink grant to the first destination.

* * * * *